United States Patent
Rugeland et al.

(10) Patent No.: US 11,153,924 B2
(45) Date of Patent: Oct. 19, 2021

(54) SECURE NETWORK CONNECTION RESUME

(71) Applicant: TELEFONAKTIEBOLAGET LM ERICSSON (PUBL), Stockholm (SE)

(72) Inventors: Patrik Rugeland, Stockholm (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/496,407

(22) PCT Filed: Mar. 20, 2018

(86) PCT No.: PCT/IB2018/051878
§ 371 (c)(1),
(2) Date: Sep. 20, 2019

(87) PCT Pub. No.: WO2018/172943
PCT Pub. Date: Sep. 27, 2018

(65) Prior Publication Data
US 2021/0274583 A1    Sep. 2, 2021

Related U.S. Application Data

(60) Provisional application No. 62/473,665, filed on Mar. 20, 2017.

(51) Int. Cl.
*H04W 76/19* (2018.01)
*H04W 76/11* (2018.01)
(Continued)

(52) U.S. Cl.
CPC ........... *H04W 76/19* (2018.02); *H04W 12/03* (2021.01); *H04W 12/0431* (2021.01);
(Continued)

(58) Field of Classification Search
CPC ..... H04W 76/19; H04W 76/11; H04W 12/63; H04W 12/0431; H04W 12/03; H04W 68/005
(Continued)

(56) References Cited

U.S. PATENT DOCUMENTS

| 5,889,861 A | 3/1999 | Ohashi et al. |
| 8,654,693 B2 * | 2/2014 | Song ................. H03M 13/2915 370/310 |

(Continued)

OTHER PUBLICATIONS

ETRI, Discussion on the unique eNB ID for NB-IOT UP solution, R2-160508, 3GPP TSG-RAN WG2 NB-IOT Ad-hoc Meeting, Budapest, Hungary, Jan. 19-21, 2016.

(Continued)

*Primary Examiner* — Nghi H Ly

(57) ABSTRACT

A method in a network node includes obtaining a first identifier associated with resuming an inactive connection between a wireless device and a network. The method further includes receiving a second identifier from the wireless device. The second identifier is either the same as the first identifier or is associated with the first identifier. The method further including determining a location indicator based on the second identifier. The location indicator indicates a location within the network from which to obtain information associated with the connection. The method further including obtaining the information associated with the connection from the location indicated by the location indicator. The method further including using the information associated with the connection to facilitate resuming the connection between the wireless device and the network.

56 Claims, 9 Drawing Sheets

(51) Int. Cl.
  *H04W 68/00* (2009.01)
  *H04W 12/03* (2021.01)
  *H04W 12/0431* (2021.01)
  *H04W 12/63* (2021.01)

(52) U.S. Cl.
  CPC ......... *H04W 12/63* (2021.01); *H04W 68/005* (2013.01); *H04W 76/11* (2018.02)

(58) Field of Classification Search
  USPC ................ 370/329, 328, 338, 341, 345, 350
  See application file for complete search history.

(56) References Cited

U.S. PATENT DOCUMENTS

| | | | | |
|---|---|---|---|---|
| 9,085,927 | B2* | 7/2015 | Oshima | E05F 15/43 |
| 2008/0051082 | A1* | 2/2008 | Howe | H04W 8/12 |
| | | | | 455/433 |
| 2014/0274135 | A1* | 9/2014 | Edge | H04L 67/18 |
| | | | | 455/456.2 |

OTHER PUBLICATIONS

3rd Generation Partnership Project; Technical Specification Group Services and System Aspects; Architecture anhancements for Cellular Internet of Things (Release 13), 3GPP TR 23.720 V1.1.0, Oct. 2015.

Alcatel-Lucent, et al., Commenting contribution on Ericsson's S3-160157 "Security for RRC Connection Suspend and Resume procedure in solution 18 for Narrow Band CIoT", S3-160225 revision of S3-16abcd, 3GPP TSG-SA WG3 Meeting #82, Dubrovnik, Croatia, Feb. 1-5, 2016.

Ericsson, Signalling flows for paging and resume for inactive state, Tdoc R2-166920, 3GPP TSG-RAN WG2 #95bis, Kaohsiung, Taiwan, Oct. 10-14, 2016.

Catt, Open Issues of Solution 18, R2-160460, 3GPP TSG RAN WG2 #NB-IOT, Budapest, Hungary, Jan. 19-21, 2016.

Intel Corporation, et al., Introduction of Light Connection in LTE stage-2 specification, R2-1702349, 3GPP TSG RAN WG2 Meeting #97, Athens, Greece, Feb. 13-17, 2017.

Ericsson, Resume ID, Tdoc R2-160474, 3GPP TSG-RAN WG2 NB-IOT Ad-hoc Meeting, Budapest, Hungary, Jan. 19-21, 2016.

* cited by examiner

SECURE NETWORK CONNECTION RESUME

This application is a 371 of International Application No. PCT/IB2018/051878, filed Mar. 20, 2018, which claims the benefit of U.S. Application No. 62/473,665, filed Mar. 20, 2017, the disclosures of which are fully incorporated herein by reference.

TECHNICAL FIELD

The present disclosure relates, in general, to wireless communications and, more particularly, to handling resuming connections in a wireless network.

BACKGROUND

An important feature in modern communications systems is the ability for wireless devices to go idle or suspend an active connection, thereby reducing network resources and energy use when the wireless device does not need to communicate on the network. A wireless device may resume a connection on the communications network after being communicated a resume identification from the network. Several standards address how a wireless device may resume a connection.

For example, Long-Term Evolution (LTE) Rel-13 introduced a Suspended RRC state, where a user equipment (UE) in RRC_CONNECTED state would be released to an RRC_IDLE state with an indicator of the releaseCause as rrc-Suspend-v1320 (TS 36.331).

```
ReleaseCause ::=  ENUMERATED {loadBalancingTAUrequired,
                              other, cs-FallbackHighPriority-v1020,
rrc-Suspend-v1320}
```

When releasing the UE, the UE would be provided with a resumeIdentity:

```
RRCConnectionRelease-v1320-IEs::= SEQUENCE {
    resumeIdentity-r13          ResumeIdentity-r13   OPTIONAL, -- Need
OR
    nonCriticalExtension        SEQUENCE { }         OPTIONAL
}
```

When resuming its connection, the UE sends an RRC-ConnectionResumeRequest including this resumeIdentity (which may possibly be a truncated resumeIdentity if the eNB has signalled this in SIB2).

```
RRCConnectionResumeRequest-r13-IEs ::= SEQUENCE {
resumeIdentity-r13              CHOICE {
resumeID-r13                        ResumeIdentity-r13,
truncatedResumeID-r13               BIT STRING
                                    (SIZE (24))
},
shortResumeMAC-I-r13            BIT STRING
                                (SIZE (16)),
resumeCause-r13                 ResumeCause,
spare                           BIT STRING
                                (SIZE (1))
}
```

When a UE is paged in RRC Suspend, it is paged using the core network (CN) identifier (e.g., a SAE-Temporary Mobile Subscriber Identity (S-TMSI) or an International Mobile Subscriber Identity (IMSI)) and may be initiated by the Mobility Management Entity (MME).

Afterwards, in LTE Rel-14, a similar feature known as 'Light Connection' was introduced. For this, the UE remains in RRC_CONNECTED, but only performs IDLE mode mobility procedures (e.g., reselects cells based on measurements instead of sending measurement reports to the Evolved Node B (eNB) or another network node which can handover the UE to another eNB). Similar to Rel-13 suspend/resume, the UE is released from RRC_CONNECTED with the RRCConnectionRelease, but with a new indicator rrc-LightConnectionIndication-r14 where the UE is provided with a ResumeID.

During 3GPP_RAN2 #97, it was agreed that:

1. The Resume ID will be used in the RAN initiated paging message.

2 UE in light connection behavior upon reception of paging: UE in light connection checks both Resume ID and CN paging ID (i.e. S-TMSI or IMSI).

2.1 When is paged using CN paging ID while the UE is in light connection, the UE enters into idle mode and follows legacy procedure (e.g., a new connection RRC Connection is established).

TABLE 1

Resume ID Contents

| IE/Group Name | Presence | Range | IE Type and Reference | Semantics Description |
|---|---|---|---|---|
| CHOICE Resume ID | M | | | |
| >Resume ID not truncated | | | | |
| >>Resume ID not truncated | M | | BIT STRING (SIZE (40)) | 40 bit Resume Resume Identity contained in the RRCConnection ResumeRequest message (TS 36.331 [9]). The 20 most significant bits refer to the eNB ID of the eNB that allocated the Resume ID, the 20 least significant bits identify the UE Context stored at the eNB that allocated the Resume ID. |
| >Resume ID truncated | | | | |
| >>Resume ID truncated | M | | BIT STRING (SIZE (24)) | 24 bit Resume Identity contained in the RRCConnection ResumeRequest message (TS 36.331 [9]). The 12 most significant bits refer to the 12 least significant bits of the eNB ID of the eNB that allocated the Resume ID. The 12 least significant bits refer to the 12 least significant bits that identify the UE Context stored at the eNB that allocated the Resume ID. |

As captured in 3GPP TS 36.423 (excerpt below). The Resume ID consists of 40 bits where the first 20 bits indicate which eNB stores the UE Context, and the last 20 bits indicate the UE ID within that eNB.

The Resume ID information element (IE) is used to address a suspended UE Context within an eNB.

After RAN2 #97, an email discussion [97 #21] related to Light Connection was initiated, resulting in a CR for TS 36.331 (R2-1702421). In this CR, some of the changes were made in relation to the Resume ID were to add it as an identity in the paging message:

```
Paging message
-- ASN1START
Paging ::=                    SEQUENCE         (
    pagingRecordList              PagingRecordList        OPTIONAL,      --Need ON
    systemInfoModification             ENUMERATED {true}       OPTIONAL,      -- Need ON
    etws-Indication                    ENUMERATED {true}       OPTIONAL,      -- Need ON
    nonCriticalExtension          Paging-v890-IEs         OPTIONAL
}
Paging-v890-IEs ::=           SEQUENCE {
    lateNonCriticalExtension          OCTET STRING            OPTIONAL,
    nonCriticalExtension              Paging-v920-IEs         OPTIONAL
}
Paging-v920-IEs ::=           SEQUENCE {
cmas-Indication-r9                 ENUMERATED {true}       OPTIONAL,      --Need ON
    nonCriticalExtension                   Paging-v1130-IEs   OPTIONAL
}
Paging-v 1130-1Es ::=         SEQUENCE {
    eab-ParamModification-r11          ENUMERATED {true}       OPTIONAL,      -- Need ON
    nonCriticalExtension              Paging-v1310-1Es        OPTIONAL
}
Paging-v1310-IEs ::=          SEQUENCE {
    redistributionIndication-r13       ENUMERATED {tnie}       OPTIONAL,      --Need ON
    systemInfoModification-eDRX-r13        ENUMERATED {true}   OPTIONAL,      -- Need ON
```

-continued

```
    nonCriticalExtension            SEQUENCE { }         OPTIONAL
}
PagingRecordList ::=                SEQUENCE (SIZE (I..maxPageRec)) OF PagingRecord
PagingRecord ::=                    SEQUENCE {
    ue-Identity                         PagingUE-Identity,
    cn-Domain                           ENUMERATED {ps, cs},
    ...
}
PagingUE-Identity ::=               CHOICE {
    s-TMSI                                              S-TMSI,
    imsi                                    IMSI,
    ...,
    [[
    resumeIdentity-r14              ResumeIdentity-r13   OPTIONAL      -- Need ON
    ]]
}
IMSI ::=                            SEQUENCE (SIZE (6..21)) OF IMSI-Digit
IMSI-Digit ::=                      INTEGER (0..9)
-- ASN1STOP
```

A main difference between Rel-13 Suspend/Resume and Rel-14 Light Connection (LC) is that for LC, the core network (CN) is unaware that the UE is suspended. This means that it is up to the Radio Access Network (RAN) to ensure that the UE can be reached when it needs to be paged. This is done via a so-called RAN paging area, within which the UE can freely move without notifying the network. To reach the UE, the RAN pages the UE using the Resume ID and the UE responds with the Resume ID to enable contention resolution (ensuring that the responding UE is the one that was paged).

In New Radio (NR), also referred to as 5G, it has been agreed to introduce a new RRC state, i.e. RRC_INACTIVE which will have several features in common with the Rel-13 suspend/resume procedure and the Rel-14 Light Connection feature.

It has been agreed for NR during 3GG_RAN2 #97 that:

Agreements for common aspects of the potentials solutions for UL data in inactive (as yet there is no agreement to support UL data in inactive):

1a1: The UE AS context identifier used for uplink data transmission in RRC_INACTIVE should be the same as the one used in state transition from RRC_INACTIVE to RRC_CONNECTED.

1a2: The UE AS context is located and identified in the network via an "AS Context ID" which is allocated by the network and stored in the UE (and the network) when the UE goes to RRC_INACTIVE and is used to locate the AS context when the UE either tries to transmit small data and/or to perform a transition to RRC_CONNECTED.

1c: The UE AS Context can be stored in an "anchor"/source gNB and may be fetched to the new serving gNB when needed upon the triggering of small data transmission and/or transition from RRC_INACTIVE to RRC_CONNECTED.

Accordingly, the UE AS context identifier could serve a similar function as the Resume ID, although the design of the UE AS context identifier may be different.

As shown above, conventional techniques of resuming connections typically include the resume identification being sent unsecured over the network. The unsecured resume identification may be intercepted and used by unauthorized persons to deduce sensitive information about the wireless device, its user, and the network. Therefore, existing solutions do not adequately address the privacy and security concerns that result from resuming connections using resume identification.

SUMMARY

According to certain embodiments, a method is disclosed for use in a network node. The method comprises obtaining a first identifier associated with resuming an inactive connection between a wireless device and a network. The method further includes receiving a second identifier from the wireless device. The second identifier is either the same as the first identifier or is associated with the first identifier. The method further including determining a location indicator based on the second identifier. The location indicator indicates a location within the network from which to obtain information associated with the connection. The method further including obtaining the information associated with the connection from the location indicated by the location indicator. The method further including using the information associated with the connection to facilitate resuming the connection between the wireless device and the network.

According to certain embodiments, a network node comprises one or more interfaces, memory, and processing circuitry. The processing circuitry is configured to execute instructions stored by the memory. The network node is configured to obtain a first identifier associated with resuming an inactive connection between a wireless device and a network. The first identifier is obtained via the one or more interfaces. The network node is further configured to receive, via the one or more interfaces, a second identifier from the wireless device. The second identifier is either the same as the first identifier or is associated with the first identifier. The network node is further configured to determine a location indicator based on the second identifier. The location indicator indicates a location within the network from which to obtain information associated with the connection. The network node is further configured to obtain the information associated with the connection from the location indicated by the location indicator. The processing circuitry is further configured to use the information associated with the connection to facilitate resuming the connection between the wireless device and the network.

According to certain embodiments, a computer program product comprises a non-transitory computer readable medium storing computer readable program code. The computer readable program code comprises program code for receiving a second identifier from the wireless device. The second identifier is either the same as the first identifier or is associated with the first identifier. The computer readable program code further comprises program code for determining a location indicator based on the second identifier. The location indicator indicates a location within the network from which to obtain information associated with the connection. The computer readable program code further comprises program code for determining a location indicator based on the second identifier. The location indicator indicates a location within the network from which to obtain information associated with the connection. The computer readable program code further comprises program code for obtaining the information associated with the connection from the location indicated by the location indicator. The computer readable program code further comprises program code for using the information associated with the connection to facilitate resuming the connection between the wireless device and the network.

The above-described method, network node, and/or computer program code may include various other features, including any one or more of the following:

In certain embodiments, the method/network node/computer program code further comprises sending a page to the wireless device. The page comprises the first identifier. The second identifier is received in response to the page.

In certain embodiments, wherein determining the location indicator comprises sending a request to a second network node, the request comprising the second identifier. Determining the location indicator further comprises receiving the location indicator from the second network node in response to sending the request comprising the second identifier.

In certain embodiments, the location indicator is determined using a lookup table that comprises a mapping between the second identifier and the location indicator.

In certain embodiments, the location indicator is determined by decrypting the second identifier.

In certain embodiments, the method/network node/computer program code further comprises generating the first identifier prior to receiving the second identifier from the wireless device. The first identifier is generated based on the location indicator.

In certain embodiments, generating the first identifier comprises encrypting the location indicator.

In certain embodiments, generating the first identifier comprises using a lookup table that comprises a mapping between the location indicator and the first identifier.

In certain embodiments, the first identifier is generated randomly or pseudo-randomly based on the location indicator.

In certain embodiments, the method/network node/computer program code further comprises receiving at least the first identifier from a second network node. The second network node suspended the connection with the wireless device.

In certain embodiments, the method/network node/computer program code further comprises receiving the first identifier and the location indicator from a second network node. The second network node suspended the connection with the wireless device.

In certain embodiments, the method/network node/computer program code further comprises detecting inactivity at the wireless device. The method/network node/computer program code further comprises sending a request to the wireless device to suspend the connection.

In certain embodiments, the request to the wireless device to suspend the connection comprises a third identifier associated with a second location within the network from which to obtain information associated with the connection.

In certain embodiments, the request to the wireless device to suspend the connection further comprises a second location indicator indicating the second location within the network from which to obtain information associated with the suspended connection.

In certain embodiments, the method/network node/computer program code further comprises sending the second location indicator to a second network node in response to detecting inactivity at the wireless device. The method/network node/computer program code further comprises obtaining the third identifier associated with the second location indicator from the second network node. The request to the wireless device to suspend the connection comprises the third identifier.

In certain embodiments, the method/network node/computer program code further comprises assigning a third identifier associated with the wireless device. The request to the wireless device to suspend the connection comprises the third identifier.

In certain embodiments, the method/network node/computer program code further comprises generating a third identifier associated with the wireless device based on the second identifier and wherein the request to the wireless device to suspend the connection comprises the third identifier.

In certain embodiments, the location indicator comprises a wireless device AS Context ID.

In certain embodiments, neither the first identifier nor the second identifier provides the location indicator in clear text form.

In certain embodiments, the method/network node/computer program code further comprises sending the wireless device a public encryption key associated with the network node. At least a portion of the received second identifier received is encrypted by the public encryption key associated with the network node.

According to certain embodiments, a method is disclosed for use in a wireless device. The method comprises receiving a first identifier. The first identifier is associated with resuming a connection that is inactive. The connection is between the wireless device and a network. The method further comprises sending, to a network node, a second identifier that is either the same as the first identifier or is associated with the first identifier. The second identifier is associated with a location indicator that indicates a location within the network from which to obtain information associated with the connection. The method further comprises resuming the connection with the network using the information associated with the connection that the network node obtains from the location indicated by the location indicator.

According to certain embodiments, a wireless device comprises one or more interfaces, memory, and processing circuitry. The processing circuitry is configured to execute instructions stored in the memory. The wireless device is configured to receive, via the one or more interfaces, a first, identifier. The first identifier is associated with resuming a connection that is inactive. The connection is between the wireless device and a network. The wireless device is further configured to send, via the one or more interfaces, to a network node, a second identifier that is either the same as the first identifier or is associated with the first identifier. The second identifier is associated with a location indicator that indicates a location within the network from which to obtain information associated with the connection. The wireless device is further configured to resume the connection with the network using the information associated with the connection that the network node obtains from the location indicated by the location indicator.

According to certain embodiments, a computer program product comprises a non-transitory computer readable medium storing computer readable program code. The computer readable program code comprises program code for receiving a first identifier. The first identifier is associated with resuming a connection that is inactive. The connection is between the wireless device and a network. The computer readable program code further comprises program code for sending, to a network node, a second identifier that is either the same as the first identifier or is associated with the first identifier. The second identifier is associated with a location indicator that indicates a location within the network from which to obtain information associated with the connection. The computer readable program code further comprises program code for resuming the connection with the network using the information associated with the connection that the network node obtains from the location indicated by the location indicator.

The above-described method, wireless device, and/or computer program code may include various other features, including any one or more of the following:

In certain embodiments, the first identifier is generated randomly or pseudo-randomly based on the location indicator.

In certain embodiments, the method/wireless device/computer program code further comprises receiving a request from the network to suspend the connection in response to inactivity of the wireless device.

In certain embodiments, the request from the network to suspend the connection comprises a third identifier associated with a second location within the network from which to obtain information associated with the connection.

In certain embodiments, the request to the wireless device to suspend the connection further comprises a second location indicator indicating the second location within the network from which to obtain information associated with the connection.

In certain embodiments, the location indicator comprises a wireless device AS Context ID.

In certain embodiments, the location within the network from which to obtain information associated with the suspended connection corresponds to a location of a second network node to which the wireless device has a suspended connection.

In certain embodiments, the method/wireless device/computer program code further comprises obtaining the location indicator using the first identifier. The second identifier sent to the network node comprises the location indicator.

In certain embodiments, the method/wireless device/computer program code further comprises receiving a public encryption key associated with the network node. Sending the response to the network node comprises encrypting at least a portion of the second identifier by the public encryption key associated with the network node.

In certain embodiments, neither the first identifier nor the second identifier provides the location indicator in clear text form.

In certain embodiments, receiving the first identifier comprises receiving a page from the network node, the page comprising the first identifier. The second identifier is sent to the network node in response to the page.

In certain embodiments, the request to the wireless device to suspend the connection comprises a third identifier based on the location indicator.

In certain embodiments, the request to the wireless device to suspend the connection further comprises the location indicator.

Certain embodiments of the present disclosure may provide one or more technical advantages. For example, certain embodiments allow a network node to resume a connection with a user equipment without exposing sensitive data regarding the user equipment and its connection to the network by segregating the paging information to the user equipment from the location information, e.g., the location of the user equipment context identification. Because the paging information, e.g., a first identifier, does not expose the location information when broadcast on the network or when communicated from the user equipment back to a network node, it may prevent the security and privacy issues that arise in conventional methods. As another example, certain embodiments allow for the retrieval of the location information regarding the connection between the network and the user equipment based on a received identifier from the user equipment. The received identifier from the user equipment may be the paging identifier sent from the network node, e.g., the first identifier, or it may be another identifier associated with the first identifier. The received identifier may be associated with the location information, such that the network node may retrieve the necessary information about the connection to resume the connection with the user equipment. In this manner, the network node may successfully resume the connection even if the communicated identifiers do not themselves contain the location information. As yet another example, certain embodiments allow for the suspension of a connection when the user equipment is determined to be idle. A network node may generate an identifier based on the connection information and location information of the connection information and communicate the identifier to the user equipment. The identifier may then be used in subsequent communications on the network to resume the connection.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
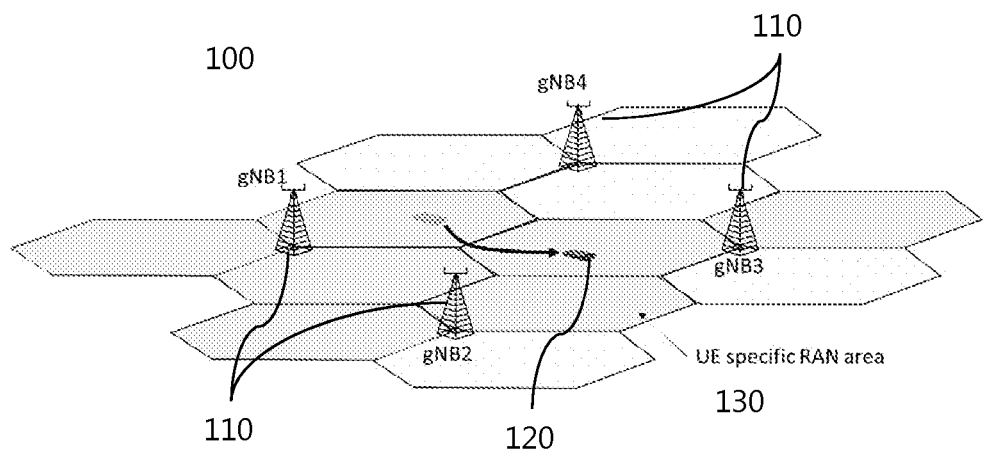
FIG. 1 illustrates an example radio access network serving a user equipment, in accordance with certain embodiments.

An important feature for the LTE Light Connection and RRC_INACTIVE is the ability for the RAN to reach the UE by initiating a RAN page inside the configured 'RAN notification area'. This RAN area is configured as a list of cells associated to one or more nodes (eNB/gNB). FIG. 1 illustrates an example communications network 100 with a plurality of network nodes 110 (also referred to as gNB1 through 4), a user equipment (UE) 120, and a RAN area 130. UE 120 is configured with RAN area 130 consisting of all cells associated to gNB1 and a subset of the cells associated to gNB2 and gNB3. The UE can freely move while in RRC_INACTIVE between the cells inside configured RAN area 130.

Figure 2:
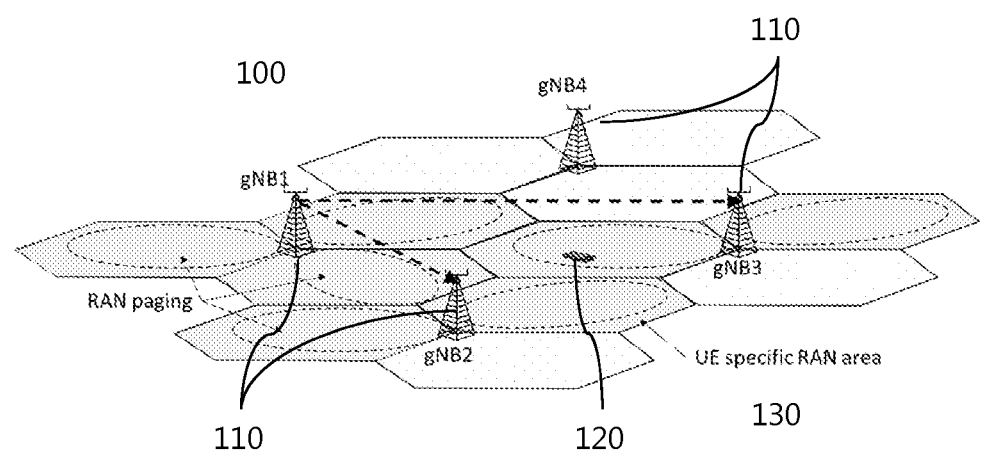
FIG. 2 illustrates the example radio access network paging the user equipment within the RAN area of the user equipment, in accordance with certain embodiments.

FIG. 2 illustrates communications network 100 during the paging process. When the RAN needs to reach UE 120 in RRC_INACTIVE, the node gNBi (one of gNB1-4) which has the CN/RAN connection for UE 120 initiates the RAN paging in RAN area 130. The cells associated to the source gNB are paged directly by the source gNB and for the other cells, the source gNB forwards the paging message to the other gNBs which page in the cells in the RAN area. For example, gNB1 may be the source node that UE 120 was previously connected in a RRC_CONNECTED state before transitioning to RRC_INACTIVE. gNB1 may then page all the cells associated with gNB1 and forward the paging message to gNB2 and gNB3 that are associated with other cells in RAN area 130 not associated with gNB1. This may be necessary to successfully page UE 120, because RAN area 130 may include cells not associated with the source node, e.g., gNB1. Forwarding the paging message may also include information about which cells to page in. For example, it may include information that allows network nodes gNB1, gNB2, and gNB3, to determine which cells to page. This may prevent a network node from paging in cells that are not within RAN area 130, even if those cells are associated with the respective network node.

Similar to LTE Light Connection, the RRC_INACTIVE paging message should contain an identifier of the Paging ID, e.g.:

| PagingUE-Identity ::= | CHOICE { | |
|---|---|---|
| s-TMSI | | S-TMSI, |
| imsi | | IMSI, |
| resumeIdentity-rxx | | ResumeIdentity-rxx |

The Resume ID assigned to the UE in LTE Rel-13 Suspend/Resume, LTE Rel-14 Light Connected and being considered for NR RRC_INACTIVE has both the purpose of identify the network node storing the UE context as well as the UE context in that node. For this reason, the Resume ID (in 36.423) is split into two parts:

The 20 most significant bits refer to the eNB ID of the eNB that allocated the Resume ID, the 20 least significant bits identify the UE Context stored at the eNB that allocated the Resume ID.

The problem with this configuration is that the Resume ID reveals which eNB has allocated the Resume ID which could be sensitive for end user privacy. The fact that the Resume ID is assigned in an encrypted message to the UE is not completely addressing this problem since additional problems occurs at paging or UE initiated connection resume where the Resume ID is provided in clear text as explained below.

For example, network-initiated paging using conventional configurations of the Resume ID may expose sensitive information regarding the network and the user equipment. If a UE is in EMM_REGISTERED but ECM_IDLE/RRC_IDLE, it is up to the CN to ensure that the UE can be reached e.g. when there is downlink data available, or an incoming voice call. This is done by the CN paging the UE with either the S-TMSI (SAE-Temporary Mobile Subscriber Identity) or the IMSI (International Mobile Subscriber Identity) in all, or some of the cells inside the Tracking Area(s) which the UE is registered in. In case of S-TMSI paging, the paging identity is made up of an MME identity within the MME pool area, and a UE context identity within that MME. The MME pool area could be very large and in some cases cover a whole country. The S-TMSI therefore does not give any information about which RAN node (base station) the UE was previously connected to.

In Rel-14 Light Connection and in NR RRC_INACTIVE, the CN/RAN (S1/NG) connection is maintained, whereby the CN will assume that the UE will be in ECM_CONNECTED. Therefore, if downlink data arrives, the serving gateway (SGW) will forward the data to the eNB/gNB that maintain the CN/RAN connection. It is then up to the RAN to locate and contact the UE so that it can resume its connection.

In Light Connection this is done by the RAN paging the UE with the Resume ID in all cells inside the RAN paging area (the current definition of RAN paging area is a list of cells provided to the UE, or the entire tracking area identifier (TAI) list, although there are proposals to introduce a new broadcasted RAN area identifier).

If the UE receives the page, it checks if the PagingRecord contain its stored resumeIdentity (e.g., the Resume ID) and if it does, the UE initiates the resumption procedures where it includes the resumeIdentity in the RRCConnectionResumeRequest and the receiving eNB uses the resumeIdentity to locate which eNB stores the UE context as well as the context within that eNB.

The problem is that the same resumeIdentity is used for both locating the eNB storing the UE Context, as well as paging the UE within the RAN. The page will by necessity be sent unencrypted (since all UEs need to see the resumeIdentity to see if it matches), meaning that any attacker can easily eavesdrop on the page to learn which Resume ID is being paged, and in this way also learn which eNB/gNB stores the UE Context. In this way the eavesdropper can learn which RAN node the UE being paged was previously connected.

If an eavesdropper monitors the paging in multiple cells in a region, it is possible to deduce which cells are paging UEs when the context is stored in a specific eNB/gNB, i.e. determine typical configurations of RAN areas and match resume ID to a physical location. Depending on the node types this typically could correspond to an area of between 0.01 $km^2$ to 10 $km^2$. Thus, it will be possible to deduce, when a UE is paged, which eNB/gNB stored (corresponding to UE previous location) the Context and which other cells also paged the UE.

Since it is possible to determine which UE responds to the page (using e.g. signal triangulation), it is possible to follow a UE if it is known which gNB it was connected to before, it may also be possible to know who that user is based on known starting/destination addresses, travel pattern, point of entry into the network.

Similar problems arise when the UE initiates data transmission and signaling. With the current solution the UE sends the RRCConnectionResumeRequest including the Resume ID unencrypted, e.g. when it enters a new RAN area, or want to initiate data transmission, or respond to page. With the same reasoning as described for paging, the Resume ID will give an indication which RAN node the UE was previously connected to making it possible to track when a specific UE transmits a Resume ID containing a specific eNB ID. If the UE is in CN IDLE this is not an issue since UE would use S-TMSI when initiating signaling towards the network. This will unnecessarily reveal the architecture of the network, endanger end user privacy and will reduce the security of the system.

This disclosure contemplates several solutions to avoid the privacy and security problems described above related to resuming a connection on a network. For example, certain embodiments separate the connection identifier, e.g., the Resume ID and/or UE AS Context ID from the information about which node stores the UE context. Additionally, certain embodiments allow the use of a separate identifier for paging a UE in LTE Light Connection and/or RRC_INACTIVE. The identifier(s) used for paging and resume will may appear like completely random identifiers to any eavesdropping UEs, thereby making tracking of UEs significantly more challenging. Various embodiments described herein are hide the relation between a specific Node (e.g. eNB ID) and a Resume IDs and/or UE AS Context ID used for UE signaling (e.g. paging and resume ID). Further, certain embodiments allow the network side to, determine which node in the area stores the UE context based on the connection identifier, e.g., a Resume ID provided by the UE.

As will be described in further detail below, this disclosure contemplates several embodiments for enhancing the security and privacy of resuming connections on a network. In certain embodiments, a central or distributed database entity may assign or keep track of identifiers, such as Resume IDs, as well as the mapping the identifiers, e.g., Resume ID and the location information that may be used to retrieve the context information regarding the UE.

In certain embodiments, the UE use a second identifier to resume a connection with the network. The second identifier may be a scrambled (or permutation of) the identifier sent to the UE (e.g. in paging). The network nodes may descramble or decrypt the second identifier to retrieve the first identifier or location information for UE initiated signaling.

In certain embodiments, the identifier used for resuming the connection in the target cell, e.g., the Resume ID, is separated from the Paging ID used to page the UE. In current configurations in the 3GPP, these are the same. Several embodiments may be considered based on this premise. In some embodiments, the network signals (or configures) two identifiers to the UE, e.g. both the Resume ID and the Paging ID. In some embodiments, the network signals one identifier but then the network and/or UE converts this identifier to the other. As a result, it is possible to decouple the Paging ID from the node allocating it, so the Paging ID may not reveal any privacy info. For example, the network may page with Paging ID (pseudo random) but the UE responds with a Resume ID (which contains information about where the context is stored). In another example, the network may page with the Paging ID, the UE responds with Paging ID, and the RAN node that receives the page response converts the Paging ID back to Resume ID, which can be used to locate the UE context. The Resume ID could have been provided by the source node at the time of paging.

Certain embodiments of the present disclosure may provide one or more technical advantages. For example, certain embodiments may improve the security and help protect end user privacy by reducing the chance of them being compromised when RAN paging the UE or when the UE resumes its connection. This may be achieved by using pseudo random identifiers over the radio interface for paging and resume which do not provide information about the previous location of the UE. Without this information an eavesdropper has no easy way of knowing which UE is being paged or resuming, thereby the end user privacy is guaranteed. Further, avoiding using identifiers on the radio interface which can be linked to physical nodes may protect the internal structure of the operator network that can be useful for security or commercial reasons.

Certain embodiments may hide the node information in the UE context identifier used over the radio interface for paging and resume signaling. The RAN nodes may maintain two identifiers for the UE, one used to locate the context of the UE in the RAN, while the other is used for radio interface signaling (e.g. for messages that cannot be encrypted). In some embodiments the UE is also involved in handling these different identifiers. Different methods for converting between the two identifiers are disclosed in more detail below.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying FIGS. 3-11. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

In LTE, the Resume ID for Rel-13 Suspend/Resume and Rel-14 Light Connection (LC) is 40 bits long to indicate the eNB storing the context and which specific AS Context is associated to the UE. In LC, the Resume ID is also used to page the UE inside a RAN paging area (e.g. a set of cells which the UE is configured with). As described above, the resumeIdentity is assigned to the UE when it is released from RRC_CONNECTED with a releaseCause rrc-Suspend-v1320 or an indicator rrc-LightConnectionIndication-r14.

In NR RRC_INACTIVE; the identity is proposed to be assigned to the UE in a new RRC_SUSPEND message. Described herein are some of the details of how to ensure security by not broadcasting or in any other way transmitting the resumeIdentity containing the eNB/gNB ID when paging a UE.

The design of the resumeIdentity for NR RRC_INACTIVE has not been agreed yet. A possible solution is to use the same design as in LTE. However, if the number range of 20 bits (~1 million) for gNB ID is too small for a network, e.g. when deploying an ultra-dense network using small cells (e.g. indoor) that only covers tens of square meters, the number of base stations could exceed one million if there is no reuse of the numbers nation-wide. Alternatively, 20 bits (~1 million) for the user ID could be limiting if a central node should keep the UE contexts for an entire region. However, if the clear differentiation between the eNB ID and the UE ID is relaxed (i.e. the total 40 bits can used in any way the network wants), then number range may be increased. Despite the configuration of the Resume ID, any of the embodiments disclosed herein may be applied.

FIGS. 3-6 illustrate four examples of various embodiments as signaling diagrams between a UE and the network. For example, FIGS. 3-6 illustrate a user equipment UE communicating with a network comprising a source Next Generation NodeB (gNB), e.g., gNB1 from FIGS. 1 and 2, a second gNB2, a third gNB3, a Domain Name Service (DNS) function, a serving gateway (S-GW), and a Mobility Management Entity (MME). In the examples described below, the UE was previously served by the source gNB, but had become inactive or set to a suspended state. gNB2 and gNB3 may be other network nodes serving at least one cell in the paging area of the UE.

While this example network configuration is used to describe certain embodiments, this disclosure is not limited to any particular network architecture. For, example, there may be additional or less gNBs or different network nodes, such as evolved NodeBs or any other network node. The functions of the DNS, MME, and S-GW may be implemented in any suitable network system that are communicatively coupled to network nodes serving a user equipment. For example, one of more of these systems and/or functions may be implemented in a core network (CN) node. As another example, one or more of these systems and/or functions may be implemented in a server communicatively coupled to the network.

Figure 3:
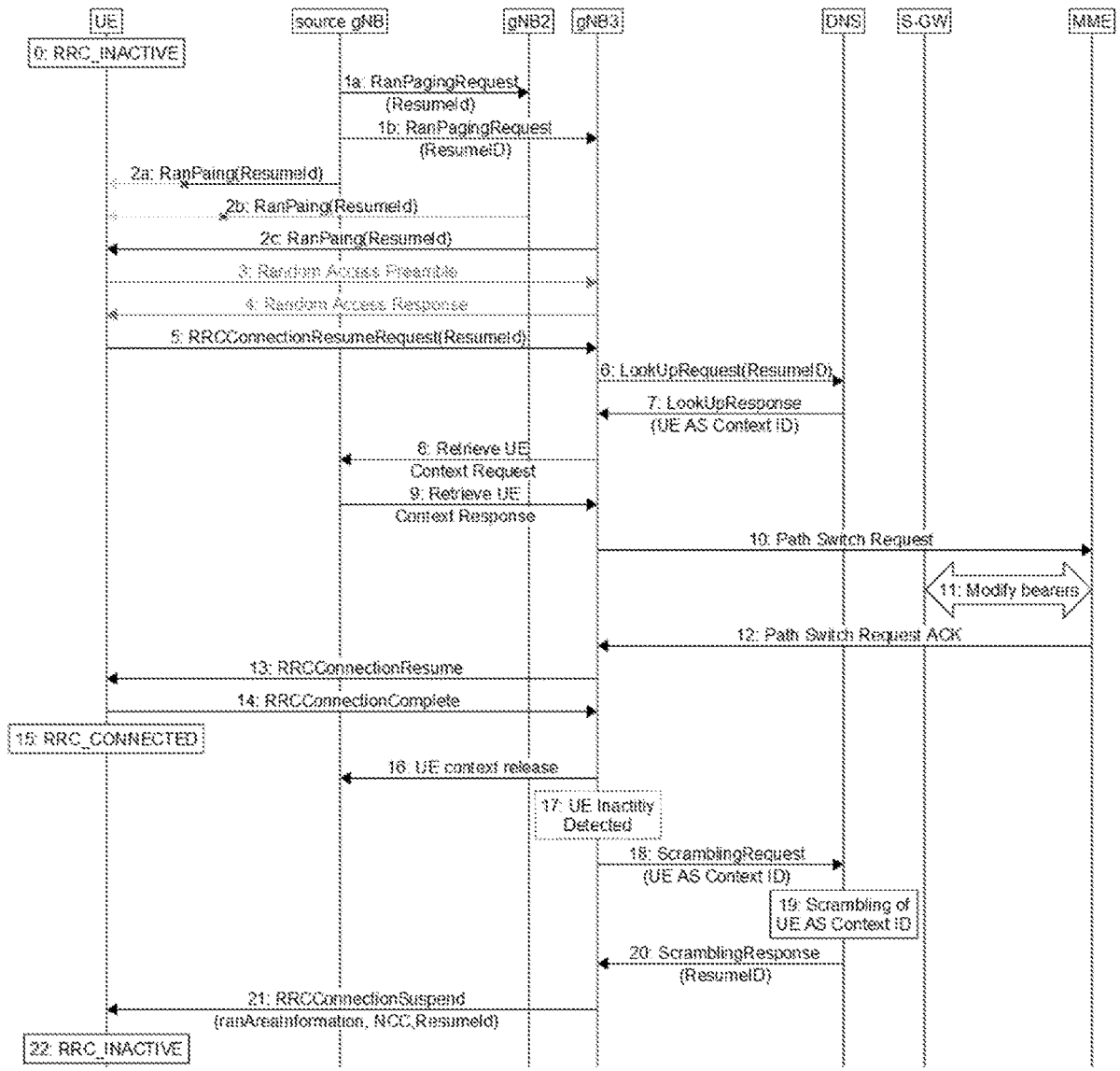
FIG. 3 is illustrates an example signaling diagram within a wireless network for a first set of embodiments.

FIG. 3 illustrates a signaling diagram for a first set of embodiments. FIG. 3 illustrates an example embodiment using a central or distributed database that may store the relationship between a Paging ID and the UE AS Context ID, which may be used to resume the connection. In certain embodiments, the UE is assigned with a single identifier, e.g., a single Resume ID. Which identifier to use for the connection is coordinated between the node assigning the Resume ID to the UE (e.g. source eNB/gNB) and a database entity (e.g. central DNS server, central or distributed database) keeping track of which Resume IDs are used by which nodes (eNBs/gNBs). The coordination of the Resume ID can be supported in different ways;

The node (e.g., eNB) allocates a local ID for the UE potentially made up of an eNB ID and UE context ID. The node then sends this ID to the database entity. The database entity may then allocate a unique (global) or network wide UE Resume ID. The Resume ID could be a unique (pseudo) random value assigned to each local ID or it could be a value calculated using the local ID (e.g. scrambled or permutated local ID). The Resume ID will then be signaled to the eNB and can be assigned (signaled) to the UE over the radio interface and used for paging, context resume.

As an alternative, the eNB may contact the database entity and request one or more Resume ID(s) that could be used to assign to different UEs. Once the requested Resume IDs are used the eNB could request additional Resume IDs.

In both cases above the data base entity may keep track of which nodes stores which Resume ID so that it can assist in locating the UE context, when the UE resumes in a new node.

In certain embodiments, when the UE performs a resume in a new node (e.g., to be served by another eNB) it may use the Resume ID it has been assigned. The new node may contact the same database entity and obtain the local ID associated with the Resume ID in order to figure out which node stores the UE context (e.g. the address of the eNB that stores the context). In some embodiments, the network nodes serving the UE, e.g., eNBs/gNBs, which may be connected to each other via X2 or Xn interface may exchange information about which Resume IDs (or Ranges of Resume IDs) they are allocating to the UEs. In this manner, no lookup may be required for nodes which are connected via Xn or X2. Additionally, in some embodiments, network nodes that receive a Resume ID from the UE but do not know the source network node may forward the request to the Core Network and receive form the Core Network the address of the source network node, e.g., by receiving the address of the source eNB that stores the UE context. The supported Resume IDs can also be exchanged between the Radio Access Network (RAN) nodes and the CN nodes so that the CN nodes can locate the context.

In certain embodiments, the UE may resume its connection to the same node where it was suspended, e.g., the source gNB. Since that node stores the UE Context, the node can directly recognize the Resume ID and know that the UE Context is available locally and there is no need to contact the database entity to find the UE Context.

As a specific example, the UE and the network elements may communicate in the following fashion, as illustrated in FIG. 3:

0. UE is initially in RRC_INACTIVE (or some suspended state)
1. Source gNB decides that UE should be RAN paged within the RAN area (e.g., in response to DL data arriving from S-GW). The RAN area may contain cells served by gNB1 (source gNB), gNB2 and gNB3. Source gNB sends a RanPagingRequest with the ResumeId associated with the UE's connection to the relevant gNBs.
2. Each of the relevant gNBs page the UE in their cells with the Resume ID. In this specific example, only gNB3 is successful since the UE is in one of gNB3s cells.
3. UE responds to the page from gNB3 with a Random Access Preamble to gNB3.
4. gNB3 responds with a Random Access Response
5. The UE sends a RRCConnectionResumeRequest to gNB3 including a second identifier that is associated with the Resume ID. In this specific example, the UE sends the Resume ID with the request. Because the UE Context ID is not included in the Resume ID, no usable sensitive information is subject to unauthorized capture.
6. Since gNB3 does not recognize the Resume ID, e.g., because it was not the previous node serving the UE or because it was not shared the UE's Resume ID from the source gNB, gNB3 sends a request to a DNS server (or some other data base node or server) with the Resume ID to determine which gNB stores the UE AS Context ID.

7. The DNS uses the Resume ID to obtain the UE AS Context ID. This UE AS Context ID is sent to gNB3. For example, the UE AS Context ID may be stored at the DNS or the DNS may retrieve the UE AS Context ID from another network system.
   a. In certain embodiments, the first identifier, e.g., the Resume ID, is generated by scrambling the UE AS Context ID using a predetermined scrambling or encrypting function. The DNS may also be able to calculate the inverse function such that the DNS can calculate the UE AS Context ID using the received Resume ID. In this manner, DNS may obtain the UE AS Context ID.
   b. In certain embodiments, the DNS stores a list mapping of the provided UE AS Context IDs with the Resume IDs. These Resume IDs may be derived with a scrambling function operating on the UE AS Context ID, or they could be derived independently from the UE AS Context ID (e.g. randomly) and only the mapping in the DNS provide the relation between the two.
8. gNB3 uses the UE AS Context ID to locate the gNB which stores the UE AS Context (in this case source gNB (gNB1)) and sends a Retrieve UE Context Request to the source gNB, including the UE AS Context ID.
   a. The UE AS Context ID may include both a UE ID part identifying the UE and a network node ID identifying the source node for the connection. In certain embodiments, gNB3 only sends the UE ID part of the UE AS Context ID to the source gNB. In this manner, only the necessary portion of the UE AS Context ID may be sent to the source gNB.
9. Source gNB (gNB1) replies with a Retrieve UE Context Response containing the UE AS Context.
10. gNB3 requests a path switch from the MME
11. The MME updates the bearer
12. The MME responds to gNB3 with a path switch request acknowledgment.
13. gNB3 sends a RRCConnectionResume to the UE
14. The UE responds to gNB3 with a RRCConnectionResumeComplete
15. The UE is in RRC_CONNECTED.
16. gNB3 contacts gNB1 to request the release of the old UE Context
   a. In certain embodiments, gNB3 can alternatively request the MME to assist in removing the old UE Context in gNB1.
17. In certain embodiments, the UE may become inactive for some time. In response, the network can decide to suspend it to RRC_INACTIVE. In the present example, gNB3 may determine that the UE has become inactive. If the UE has performed a handover to another gNB while in RRC_CONNECTED, then the new gNB serving the UE may decide whether the UE should be suspended to RRC_INACTIVE.
   a. In certain embodiments, the UE can request that it should go to RRC_INACTIVE to save on battery or otherwise conserve network or processing resources.
   b. In certain embodiments, the network can use statistics (based on the UE capabilities and/or UE behavior) to predict the UE behavior and decide that it should go to inactive.
18. gNB3 assigns a new UE AS Context ID associated to the UE AS Context. In some embodiments, the UE AS Context ID may not be sent directly to the UE. gNB3 may send a scrambling request to the DNS (or other data base node or server).
19. The DNS obtains a Resume ID associated to the UE AS Context ID.
   a. In certain embodiments, the DNS uses an invertible scrambling function with the UE AS Context ID as input and the Resume ID as output. e.g., the UE AS Context ID can be obtained using the inverse scrambling function on the Resume ID.
   b. In certain embodiments, the DNS uses a one-way scrambling function (un-invertible) with the UE AS Context ID as input and the Resume ID as output. Since the scrambling function is one-way, the DNS may store both the UE AS Context ID and the Resume ID in a lookup table.
   c. In certain embodiments, the DNS assigns a new Resume ID with no relation to the UE AS Context ID (e.g., through a random process) and saves a mapping between the Resume ID and the UE AS Context ID
20. The DNS server responds to gNB3 with the new Resume ID
21. gNB3 suspends the UE with the RRCConnectionSuspend including the new Resume ID. The UE may not be aware of the relation between the Resume ID and the UE AS Context ID.
22. UE is in RRC_INACTIVE.

In certain, neither the first identifier nor the second identifier provides the location indicator in clear text form. For example, the first identifier sent by the network node to page the wireless device may not include the UE AS Context ID or any other identification of the location of the wireless device context information. Likewise, in some embodiments, the wireless device may respond with a second identifier that is the same as the first identifier, which may not include the location indicator in clear text form. In some embodiments, the wireless device may respond with a second identifier that is different from the first identifier, but still does not provide the location indicator in clear text form. For example, the second identifier may be a scrambled or encrypted identifier that contains the location indicator or information sufficient to determine the location indicator.

Figure 4:
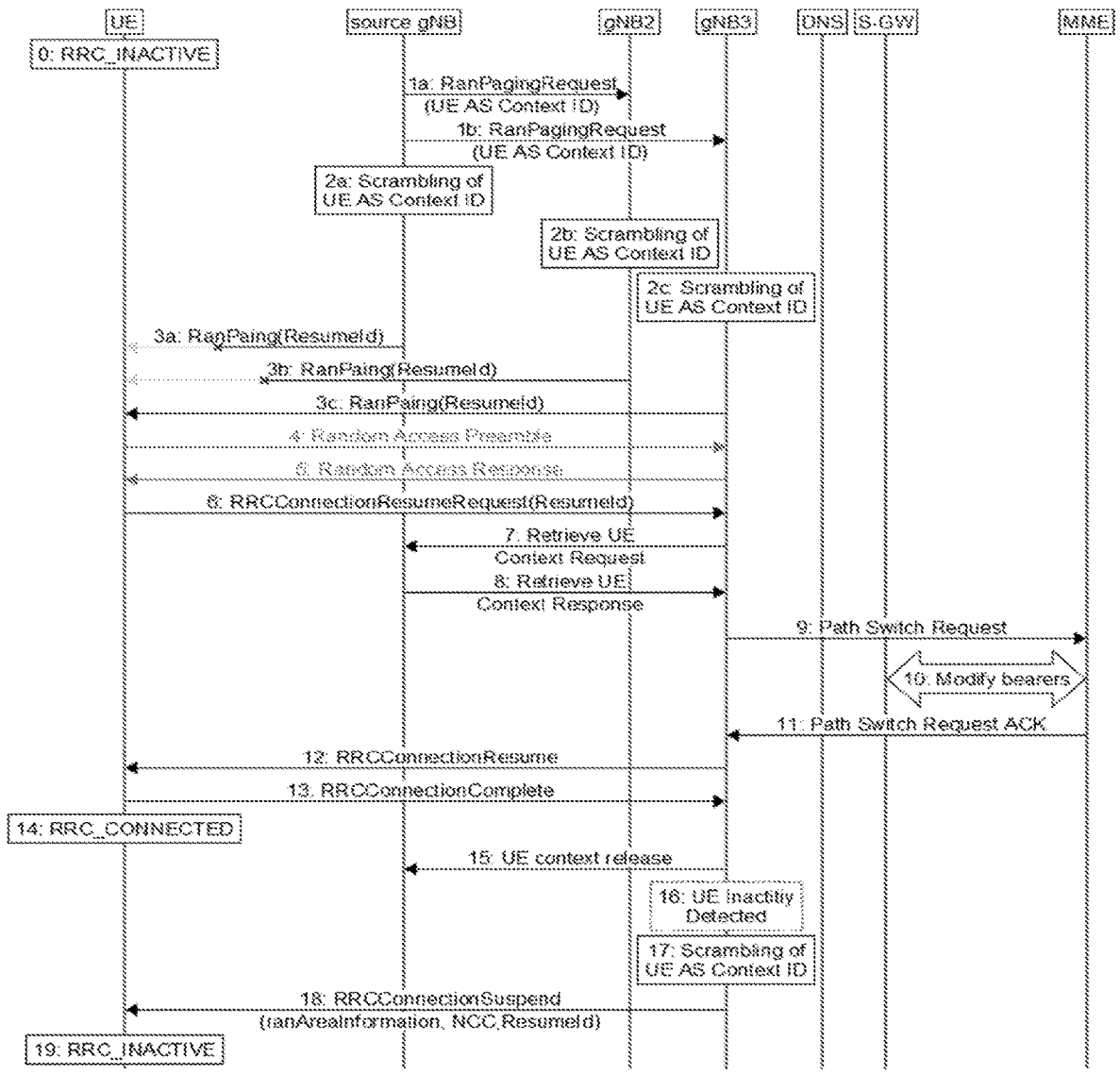
FIG. 4 is illustrates an example signaling diagram within a wireless network for a second set of embodiments.

FIG. 4 illustrates a signaling diagram for a second set of embodiments. FIG. 4 illustrates an example embodiment of resuming a connection based on scrambling (or performing a permutation of) the Resume ID sent to the UE (e.g. in paging) and de-scrambling the resume ID for UE initiated signaling. Before signaling the Resume ID to the UE, the eNB/gNB may scramble (or perform a permutation of) it in a reversible way (e.g., using a function F with a corresponding inversion function F^-1). In some embodiments, all eNB/gNBs in the local area uses the same function F and the same range of Resume IDs. These eNB/gNBs may scramble the Resume ID in the exact same way and for instance when the UE is paged in one or multiple cells with the scrambled Resume ID, the UE then responds with the scrambled Resume ID in the RRCConnectionResumeRequest. The nodes may then unscramble the Resume ID using the inversion function F^-1, to figure out which eNB ID allocated the Resume ID to the UE. In these embodiments, it may be desirable to use different functions F in different areas, and, alternatively or additionally, change the function F from time to time to prevent that the function becomes known to attackers. In some embodiments, it may be beneficial to use a part of the bits in the Resume ID sent to the UE to indicate which "function area" the Resume ID was allocated in, or which version for function F was used. In this way network nodes of neighboring areas can still descramble the Resume ID if they know which function F is used.

In certain embodiments, the paging node provides the target node with the clear text ID, but also information on how to scramble the ID. The target nodes may scramble the ID in the same way. In this way the target node can match the response form the UE.

In certain embodiments, each node uses its own scrambling function F and de-scrambling function F^−1. Information about the scrambling function F may be provided to the UE (e.g. sent using dedicated signaling or broadcasted). The de-scrambling function may not be provided to the UE and kept only at the node. For example, the network node may use public key encryption for the "scrambling" functions F and F^−1. In this example, the UE may be provided with the public key and the network node may retain the private key. In some embodiments, the act of scrambling or de-scrambling could also be based on cell specific parameters e.g., parameters broadcasted in the cell. In these embodiments, the UE may be assigned the Resume ID using encrypted messaging for all paging and resume signaling in the cell using a scrambling function F resulting in F(Resume ID). The UE may then calculate F(Resume ID) and compare that to the F(Resume ID) used for paging to determine whether the UE is being paged. The network can also calculate the Resume ID from the F(Resume ID) sent by the UE for the Resume signaling using the corresponding inverse function. In this manner, a local function F may be used for each node or cell, which does not need to be coordinated with other nodes or cells, since the scrambling is only over the radio interface. Signaling between nodes may use the clear text Resume ID.

In certain embodiments, the UE resumes the connection in the same node (eNB/gNB) which suspended it. In that case, the UE may be provided with a scrambled truncated Resume ID only to be used in the old cell in addition to the full Resume ID to be used in other cells. The truncated Resume ID only contain the UE ID part of the Resume ID and uses the same scrambling function as the non-truncated Resume ID. When the UE Resumes with the scrambled truncated Resume ID, the node (e.g. eNB/gNB) may already know which UE it is, since it knows that the context is stored in the same node.

As a specific example, the UE and the network elements may communicate in the following fashion, as illustrated in FIG. 4:

0. UE is initially in RRC_INACTIVE
1. Source gNB decides that UE should be RAN paged within the RAN area (e.g. DL data arrived from S-GW). The RAN area contains gNB1 (source gNB), gNB2 and gNB3. The source gNB sends a RanPagingRequest with the UE AS Context ID to the relevant gNBs.
2. The relevant gNBs derive the Resume ID from the UE AS Context ID based on a preconfigured scrambling function.
   a. In certain embodiments, the scrambling function used by the network nodes is a predetermined function. In some embodiments the scrambling function is based on criteria in the standards.
   b. In certain embodiments, the scrambling function is configured per public land mobile network (PLMN).
3. The relevant gNBs page the UE in their cells with the Resume ID. In this diagram, only gNB3 is successful since the UE is in one of gNB3s cells.
4. The UE responds to the page from gNB3 with a Random Access Preamble to gNB3.
5. gNB3 responds with a Random Access Response.
6. The UE sends a RRCConnectionResumeRequest to gNB3 including the Resume ID.
7. gNB3 uses the Resume ID to determine the UE AS Context ID and in turn use that to locate the gNB which stores the UE AS Context (gNB1). gNB3 may then send a Retrieve UE Context Request to the source gNB (gNB1) with the UE AS Context ID. In some embodiments, the gNB3 may de-scramble the Resume ID provided by the UE.
   a. In certain embodiments, gNB3 only send the UE ID part of the UE AS Context ID to the source gNB. In this manner, gNB3 may not send the gNB ID part of the UE AS Context ID because it is only used to identify which gNB stores the context.
8. The source gNB (gNB1) replies with a Retrieve UE Context Response containing the UE AS Context.
9. gNB3 requests a path switch from the MME
10. The MME updates the bearer
11. The MME responds to gNB3 with a path switch request acknowledgment.
12. gNB3 sends a RRCConnectionResume to the UE
13. The UE responds to gNB3 with a RRCConnectionResumeComplete
14. The UE is in RRC_CONNECTED.
15. gNB3 contacts gNB1 to request the release of the old UE Context
    a. In certain embodiments, gNB3 may alternatively request the MME to assist in removing the old UE Context in gNB1.
16. If the UE e.g. is inactive for some time, the network can decide to suspend it to RRC_INACTIVE. If the UE has performed a handover to another gNB while in RRC_CONNECTED, then the new gNB may decide whether the UE should be suspended to RRC_INACTIVE).
    a. In certain embodiments, the UE can request that it should go to RRC_INACTIVE to save on battery or otherwise conserve network or processing resources.
    b. In certain embodiments, the network can use statistics (based on the UE capabilities and/or UE behavior) to predict the UE behavior and decide that it should go to inactive.
17. gNB3 assigns a new UE AS Context ID associated to the UE AS Context and uses the same scrambling function as before to derive a Resume ID.
18. gNB3 suspends the UE with the RRCConnectionSuspend including the new Resume ID. The UE will not be aware of the relation between the Resume ID and the UE AS Context ID.
19. UE is in RRC_INACTIVE.

Figure 5:
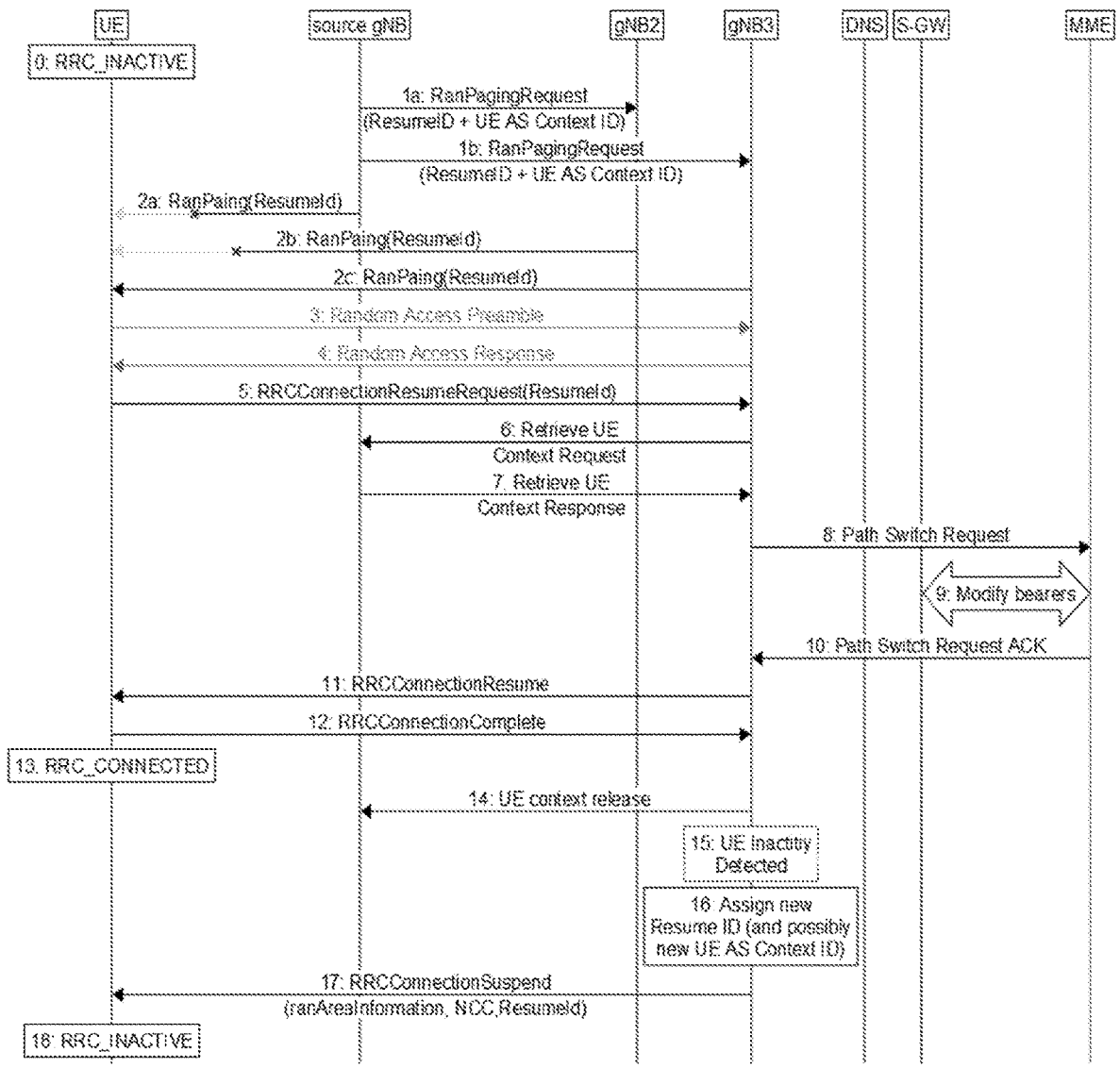
FIG. 5 is illustrates an example signaling diagram within a wireless network for a third set of embodiments.

FIG. 5 illustrates a signaling diagram for a third set of embodiments. FIG. 5 illustrates an example embodiment using separate two identifiers, such as UE AS Context ID and Paging ID and provided only one ID the UE. In certain embodiments, the RAN allocates two separate identities to a UE, e.g. a Resume ID and a UE AS Context ID when it is to be suspended to RRC_INACTIVE (the identities can be pre-allocated or allocated during the transition to RRC_INACTIVE). However, only. the Resume ID is signaled to the UE and can be (pseudo-) random or calculated from the UE AS Context ID. The UE AS Context ID on the other hand may uniquely identify the location (e.g., the gNB ID) and the UE (e.g., a UE ID) of the Context to be retrieved.

When the UE is to be paged, the source gNB may send a RAN paging request containing both the Resume ID and the UE AS Context ID to the other nodes in the RAN area. When the nodes then page the UE, they may only page using the Resume ID and the UE may respond with the Resume ID. Since the paging node has received both the Resume ID and the UE AS Context ID, it can locate where the UE context is stored when it should be retrieved. In some embodiments, the paging node keeps track of where the RAN paging request came from and uses that mapping to locate where the UE context is stored.

In order for the UE initiated resume procedure to work with the (pseudo-) random Resume ID, the target node (e.g. eNB/gNB) may be aware of the mapping between the Resume ID and the UE AS Context ID (i.e. location of the context). This could be done by prepopulating the UE context to all nodes inside the RAN area, and possibly to nodes outside the RAN area that may possibly serve the UE. Alternatively, the mapping between the Resume ID and the UE AS Context ID can be distributed to the nodes, e.g., in a similar manner as described above in reference to FIG. 3.

In certain embodiments, when a target node receives a Resume ID which it doesn't recognize, it may query its neighboring nodes. The target node may query neighboring nodes in a single step, e.g., asking all neighbor simultaneously, or in multiple steps, e.g., asking the most likely neighbor(s) first, then second likeliest, and so on. If the node (e.g. eNB/gNB) doesn't get a positive response from any of the queried neighbors, it may declare failure to retrieve the context.

As a specific example, the UE and the network elements may communicate in the following fashion, as illustrated in FIG. 5:
  0. UE is initially in RRC_INACTIVE
  1. Source gNB decides that UE should be RAN paged within the RAN area (e.g., if DL data arrived from S-GW). The RAN area may contain gNB1 (source gNB), gNB2 and gNB3. The source gNB sends a RanPagingRequest with the UE AS Context ID AND Resume ID to the relevant gNBs in the RAN area.
  2. The relevant gNBs page the UE in their cells with the Resume ID. In this diagram, only gNB3 is successful since the UE is in one of gNB3s cells.
  3. The UE responds to the page from gNB3 with a Random Access Preamble to gNB3.
  4. gNB3 responds with a Random Access Response.
  5. The UE sends a RRCConnectionResumeRequest to gNB3 including the Resume ID.
  6. Since gNB3 already has both the Resume ID and the UE AS Context ID, it identifies which node contains the UE context when it receives the Resume ID. It then sends a Retrieve UE Context Request including the UE AS Context ID.
     a. In certain embodiments, gNB3 only send the UE ID part of the UE AS Context ID to the source gNB.
  7. Source gNB (gNB1) replies with a Retrieve UE Context Response containing the UE AS Context.
  8. gNB3 requests a path switch from the MME
  9. The MME updates the bearer
  10. The MME responds to gNB3 with a path switch request acknowledgment.
  11. gNB3 sends a RRCConnectionResume to the UE
  12. The UE responds to gNB3 with a RRCConnectionResumeComplete
  13. The UE is in RRC_CONNECTED.
  14. gNB3 contacts gNB1 to request the release of the old UE Context
     a. In certain embodiments, gNB3 can request the MME to assist in removing the old UE Context in gNB1.
  15. If the UE is inactive for some time, the network can decide to suspend it to RRC_INACTIVE. In some embodiments the UE may make the request to go to RRC_INACTIVE. IN some embodiments, the network can use statistics (based on the UE capabilities and/or UE behavior) to predict the UE behavior and decide that it should go to inactive.
  16. gNB3 assigns a new Resume ID (and possibly also a new UE AS Context ID).
  17. gNB3 suspends the UE with the RRCConnectionSuspend including the new Resume ID. The UE may not aware of the relation between the Resume ID and the UE AS Context ID.
  18. UE is in RRC_INACTIVE.

Figure 6:
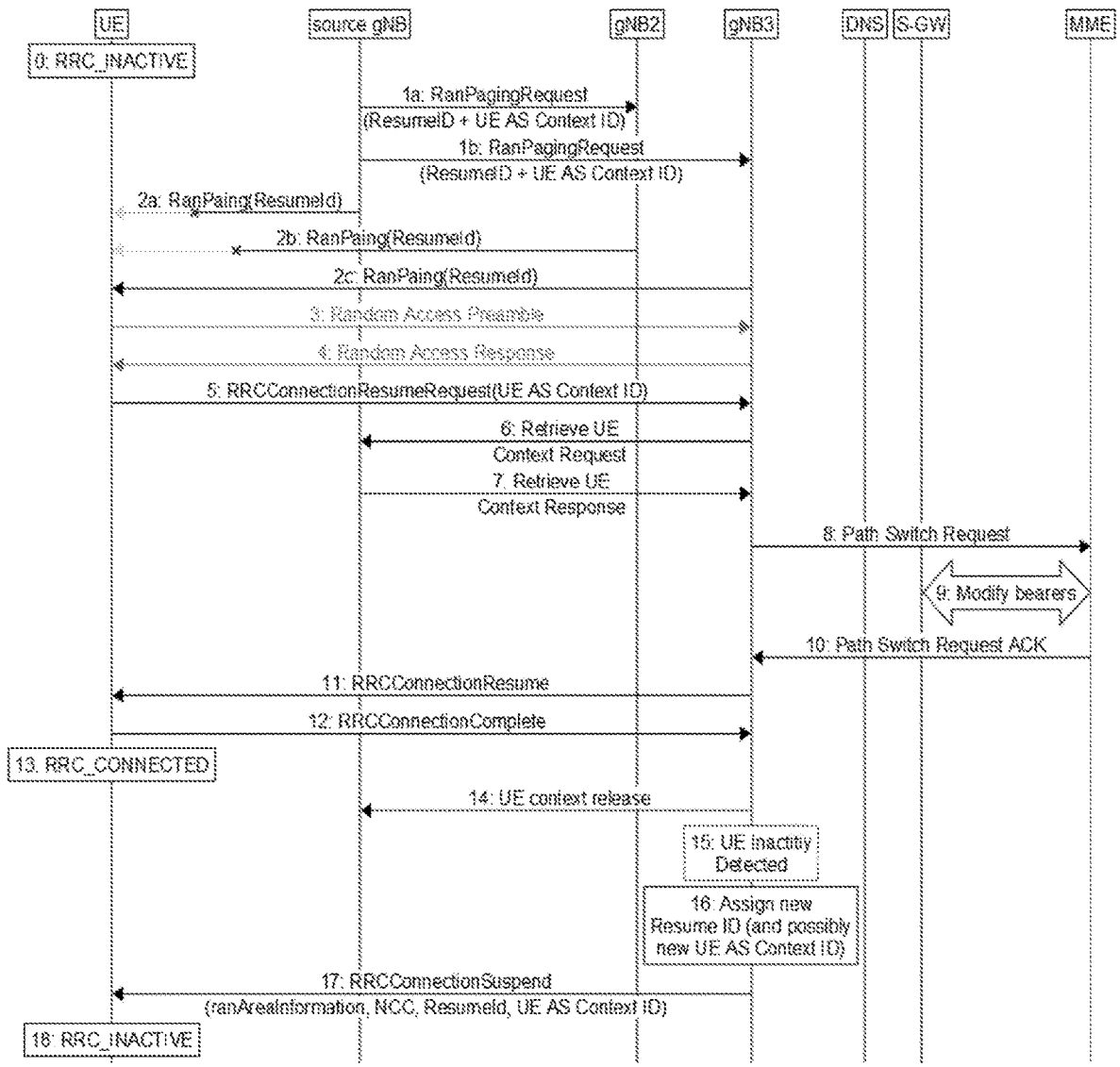
FIG. 6 is illustrates an example signaling diagram within a wireless network for a fourth set of embodiments.

FIG. 6 illustrates a signaling diagram for a fourth set of embodiments. FIG. 6 illustrates an example embodiment using separate two separate identifiers, a (pseudo-) random Resume ID and a UE AS Context ID that identifies the location of the UE contexts. In these embodiments, both identifiers may be provided to the UE when it is suspended to RRC_INACTIVE.

In certain embodiments, the UE is provided with the UE AS Context ID in an encrypted suspend message (e.g., RRCConnectionSuspend) and uses a non-invertible scrambling function F to calculate the Resume ID. In this manner, the UE may respond with the UE to confirm the resumption of the connection.

In certain embodiments, when the UE is to be paged, the source node (e.g. eNB/gNB) may send a RAN paging request to the other nodes in the RAN area containing both the Resume ID and the UE AS Context ID. In some embodiments, the RAN paging request only contains the Resume ID, and the neighboring nodes associate the Resume ID with the X2/Xn interface to locate which node stores the UE context. In some embodiments, the RAN Paging request only contains the UE AS Context ID and, the target node uses the non-invertible scrambling function F to calculate the Resume ID.

In certain embodiments, the nodes may page the UE with the (pseudo-) random Resume ID and the UE responds with the UE AS Context ID in the RRCConnectionResumeRequest. The target node may then use the UE AS Context ID to locate the UE context. In some embodiments, the UE responds with the (pseudo-) random Resume ID and the target node uses its mapping between Resume ID and UE AS Context ID (or mapping between Resume ID and X2/Xn interface to source node) to locate the UE context.

In certain embodiments, the UE may initiate a connection resume. In such cases, when the network has not paged the UE, e.g. for UE initiated data transfer/voice call, or for a location area update (RAN area update/CN tracking area update), the UE may use the UE AS Context ID in the RRCConnectionResumeRequest and the target node uses that ID to locate the UE context.

As a specific example, the UE and the network elements may communicate in the following fashion, as illustrated in FIG. 6:
  0. UE is initially in RRC_INACTIVE
  1. Source gNB decides that UE should be RAN paged within the RAN area (e.g., if DL data arrived from S-GW). The RAN area may contain gNB1 (source gNB), gNB2 and gNB3. The source gNB may send a RanPagingRequest with the UE AS Context ID AND Resume ID to the relevant gNBs.
2. The relevant gNBs page the UE in their cells with the Resume ID. In this diagram, only gNB3 is successful since the UE is in one of gNB3s cells.
3. The UE responds to the page from gNB3 with a Random Access Preamble to gNB3.
4. gNB3 responds with a Random Access Response
5. The UE sends a RRCConnectionResumeRequest to gNB3 including the UE AS Context ID. In this example, the UE sends a second identifier that is different from the first identifier sent from the paging gNBs.
6. Since gNB3 already has both the Resume ID and the UE AS Context ID, it identifies which node contain the UE context when it receives the UE AS Context ID. gNB3 then sends a Retrieve UE Context Request to source gNB (gNB1) including the UE AS Context ID.
   a. In certain embodiments, the gNB only sends the UE ID part of the UE AS Context ID to the source gNB.
7. gNB1 replies with a Retrieve UE Context Response containing the UE AS Context.
8. gNB3 requests a path switch from the MME
9. The MME updates the bearer
10. The MME responds to gNB3 with a path switch request acknowledgment.
11. gNB3 sends a RRCConnectionResume to the UE
12. The UE responds to gNB3 with a RRCConnectionResumeComplete.
13. The UE is in RRC_CONNECTED.
14. gNB3 contacts gNB1 to request the release of the old UE Context
   a. In some embodiments, gNB3 can request the MME to assist in removing the old UE Context in gNB1.
15. If the UE e.g. is inactive for some time, the network can decide to suspend it to RRC_INACTIVE. In some embodiments the UE may make the request to go to RRC_INACTIVE. IN some embodiments, the network can use statistics (based on the UE capabilities and/or UE behavior) to predict the UE behavior and decide that it should go to inactive.
16. gNB3 assigns a new Resume ID (and possibly a new UE AS Context ID)
17. gNB3 suspends the UE with the RRCConnectionSuspend including the new Resume ID AND the latest UE AS Context ID. In this case, the UE will be aware of the relation between the Resume ID and the UE AS Context ID. But, no sensitive or private information is communicated for at least the reason that response from the UE to the paging ID the same identifier (e.g., Resume ID in contrast to the UE AS Context ID)
18. UE is in RRC_INACTIVE.

Figure 7:
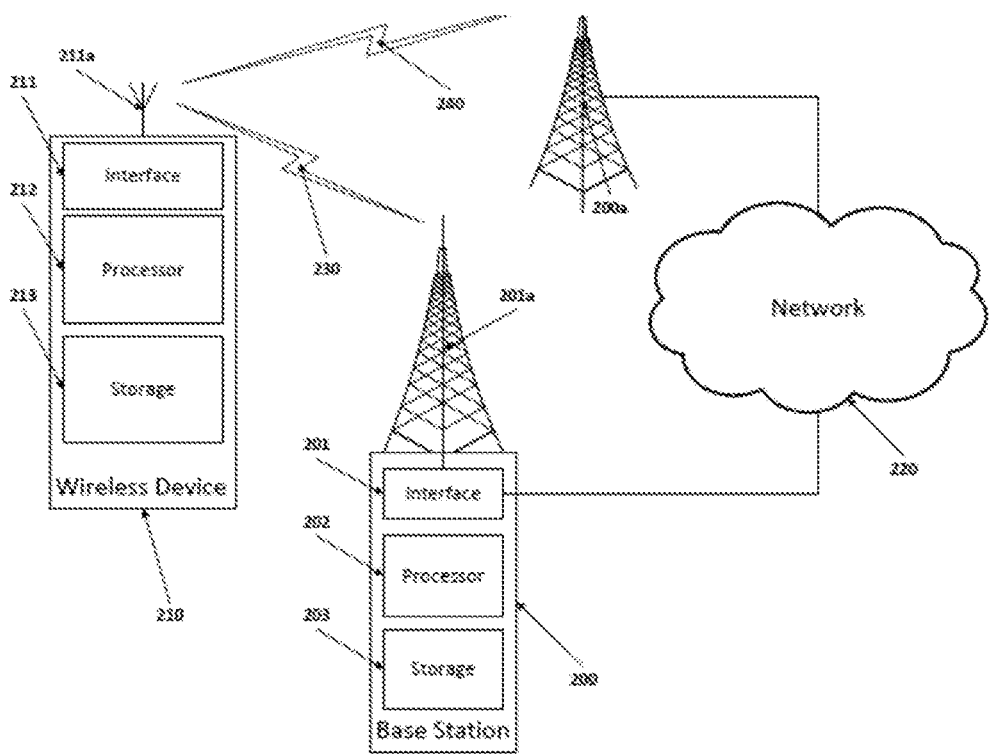
FIG. 7 is a block diagram illustrating an embodiment of a network architecture, in accordance with certain embodiments.

Although the solutions described above may be implemented in any appropriate type of system using any suitable components, particular embodiments of the described solutions may be implemented in a wireless network such as the example wireless communication network illustrated in FIG. 7. In the example embodiment of FIG. 7, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the World-wide Interoperability for Microwave Access (WiMax), Bluetooth, and/or ZigBee standards.

FIG. 7 illustrates a wireless network comprising a more detailed view of network node 200 and wireless device (WD) 210, in accordance with a particular embodiment. For simplicity, FIG. 7 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or by their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 7, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 7, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 8:
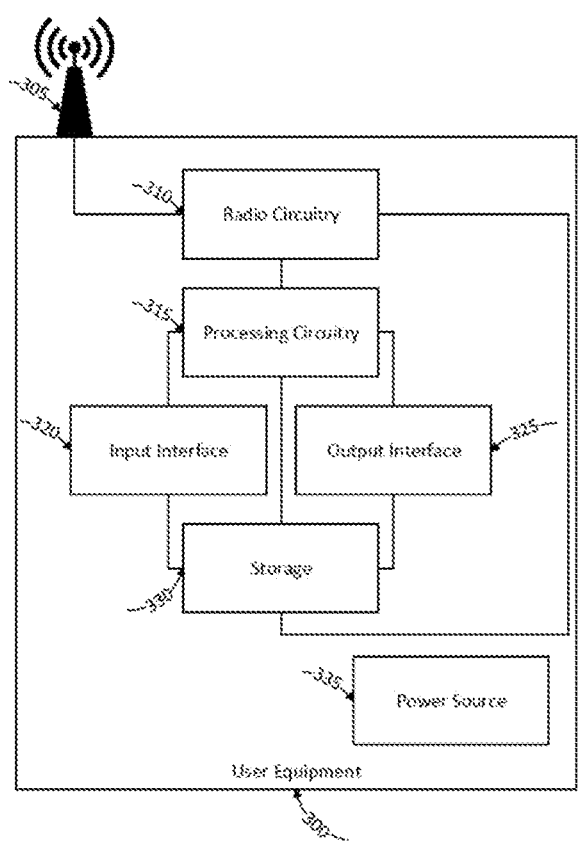
FIG. 8 is a block schematic of an exemplary wireless device, in accordance with certain embodiments.

FIG. 8 illustrates an example wireless device, user equipment (UE) 300. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 8 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 9:
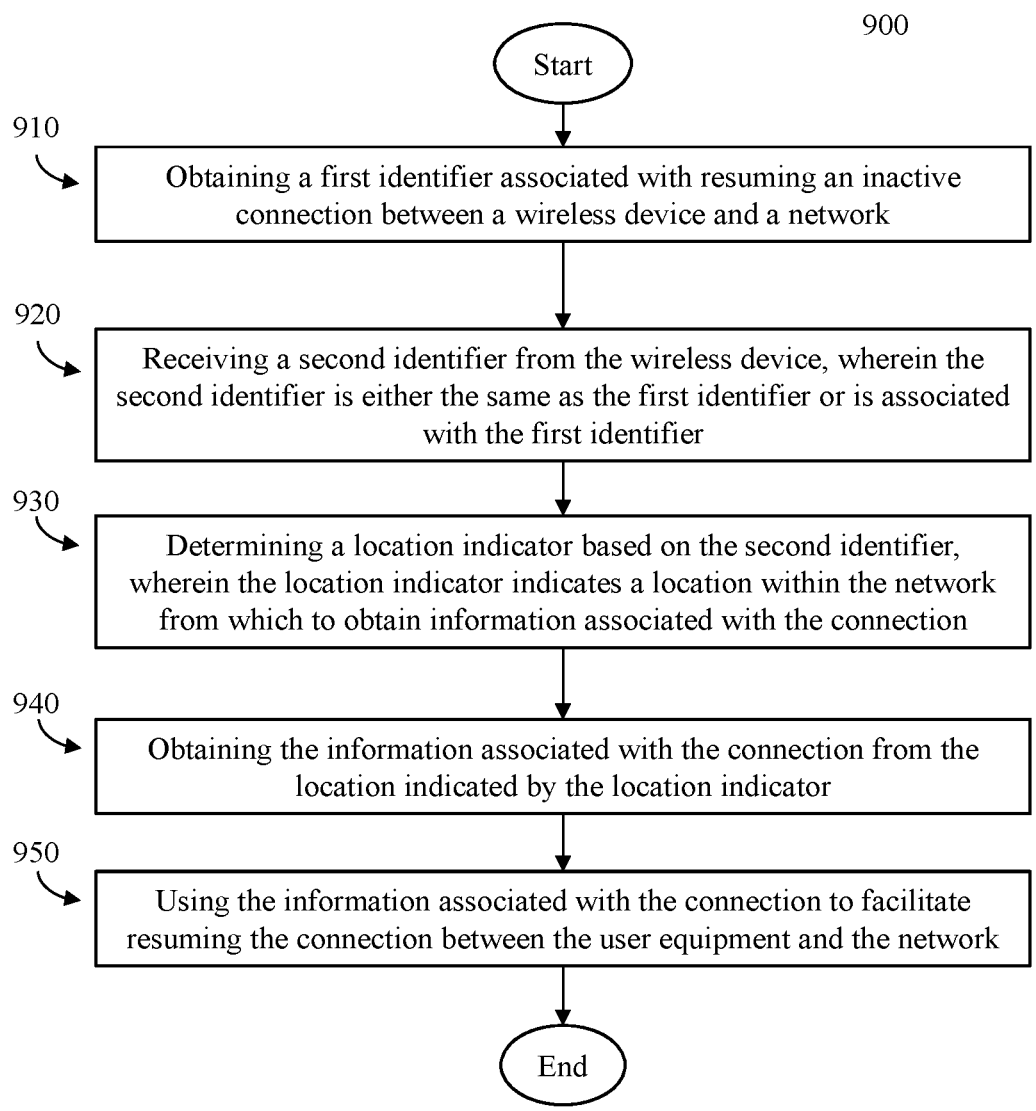
FIG. 9 is a flow diagram of a first method in a network node, in accordance with certain embodiments.

FIG. 9 is a flow chart diagram illustrating an example method 900 in a network node 110 for resuming a connection with a user equipment 120, according to certain embodiments of the present disclosure. Method 900 may begin at step 910. At step 910, a network node, such as one of network nodes 110, may obtain a first identifier. The first identifier may be associated with resuming a connection between the user equipment and a network that is inactive. For example, the network node receiving the first identifier from another network node in order to page the user equipment with a Resume ID that is associated with the UE AS Context ID. If the user equipment is within the paging area of the network node, the UE may respond to the page. As another example, the network node may obtain the first identifier from another network node in response to the network determining that the wireless device wishes to resume the connection, e.g., in response to a reconnection request from the wireless device.

At step 920, the network node may receive a second identifier from the wireless device. The second identifier may be the same as the first identifier or is associated with the first identifier. For example, if the network node pages with the Resume ID, the UE may respond with the Resume ID or may alternatively respond with another identifier, such as the UE AS Context ID or another identifier from which the network node may determine the UE AS Context ID. As another example, the network node may receive the second identifier in an unsolicited reconnection request from the wireless device.

At step 930, the network node may determine a location indicator based on the second identifier. The location identifier may indicate a location within the network from which to obtain information associated with the connection. For example, the network node may determine the UE AS Context ID or some other identifying information that identifies the location of the source network node that had suspended the connection with the UE. The source node may contain information regarding the suspended connection that will enable the network node to resume the connection.

At step 940, the network node may obtain the information associated with the connection from the location indicated by the location indicator. For example, the network node may determine from the UE AS Context ID the location of the UE Context information and then request the UE Context information from that location. In particular, the network node may locate the source network node that suspended the connection with the UE may be contacted to retrieve the UE Context information. At step 950, the network node may use the information associated with the connection to facilitate resuming the connection between the user equipment and the network. For example, the network node may request a path switch request from the mobility management entity and send the UE a RRCConnectionResume signal using the connection information that the network node retrieved. In this manner, a network node may resume a connection with a UE without exposing sensitive or private information regarding the network or the user equipment to unauthorized persons.

Figure 10:
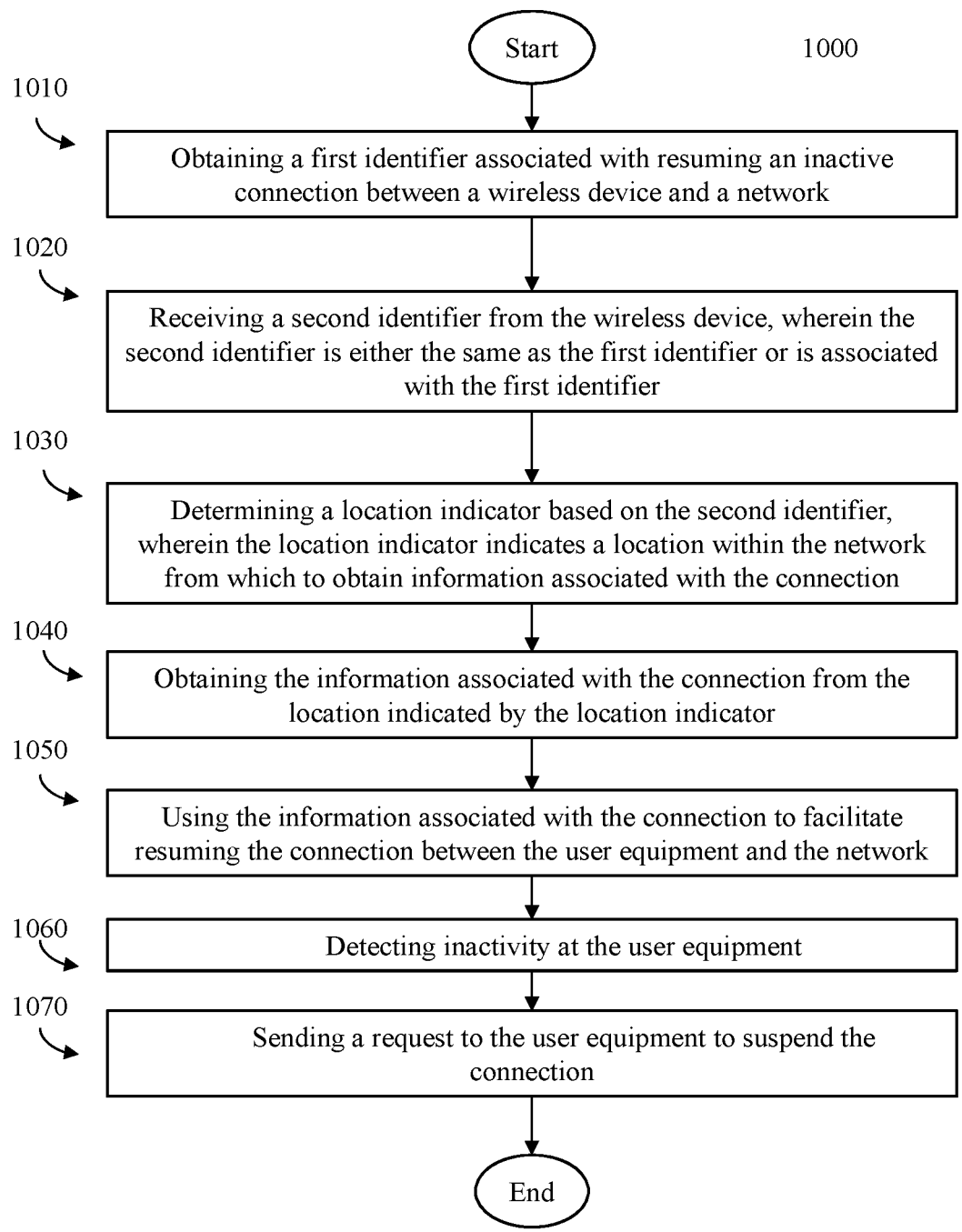
FIG. 10 is a flow diagram of a first method in a network node, in accordance with certain embodiments.

FIG. 10 is a flow chart diagram illustrating an example method 1000 in a network node 110 for resuming and suspending a connection with a user equipment 120, according to certain embodiments of the present disclosure. Method 1000 may begin with steps 1010, 1020, 1030, 1040, and 1050, which correspond to steps 910, 920, 930, 940, and 950 described above. After step 1050, the user equipment may be in an active connection state. At step 1060, the network node may detect inactivity at the user equipment. In some embodiments, the network node may detect inactivity based on a request from the UE the request to go to inactive, e.g., RRC_INACTIVE. In some embodiments, the network can use statistics (based on the UE capabilities and/or UE behavior) to predict the UE behavior and decide that it should go to inactive.

After detecting inactivity at the user equipment, method 1000 may move to step 1070 where the network node sends a request to the user equipment to suspend the connection. For example, the network node may send a RRCConnectionSuspend signal to the UE containing a Resume ID and/or a UE AS Context ID. In this manner, the user equipment may be set to an inactive state with the required information to resume the connection, according to the various embodiments described herein. In certain embodiments, the request to suspend the connection in step 1070 comprises a third identifier. The third identifier is associated with a second location within the network from which to obtain information associated with the connection. For example, the network node that is to suspend the connection may generate or have generated a third identifier, such as a new Resume ID. The third identifier would reflect the updated connection information of the connection to be suspended, including the new serving network node if the connection was resumed on a different network node than had suspended the wireless device connection in the first place. For example, the second location to obtain information associated with the connection may be the network node now requesting to suspend the connection. As another example, the second location may be another network entity communicatively coupled to the new network node, e.g., a database entity such as the DNS described in FIG. 3. In some embodiments, the request to the wireless device to suspend the connection further comprises a second location indicator indicating the second location within the network from which to obtain information associated with the suspended connection. In this manner, if the connection may be resumed once again with identifiers that protect the context information of the wireless device, but still allow for an efficient resumption of connection with the wireless device. The further resuming of the connection may be carried out by any of the embodiments described herein.

In certain embodiments, method 900 and/or 1000 may include additional steps and/or one or more steps may comprise one or more substeps or optional steps. For example, in, certain embodiments, the network node may communicate with a second network node in facilitating resuming the connection of the wireless device. The second network node may be a base station (e.g., an eNB/gNB), such as a base station that previously handled the connection before the connection became inactive. In some embodiments, the context information regarding the wireless device and the suspended connection may be stored or retrievable from the base station the previously handled the connection. Accordingly, in some embodiments, the network node may communicate with the base station that previously handled the connection to retrieve context information of the suspended connection or information to facilitate the retrieval of the information required to resume the connection. As another example, the second network node could be a database that associates the second identifier and the location indicator, for example, based on a lookup table or other mapping. In some embodiments, the network node may request the location indicator from the second network node in order to determine the location on the network from which to retrieve the information associated with the suspended connection. In some embodiments, the network node may communicate with a domain name service database to retrieve the location information.

In certain embodiments, determining the location indicator in step 940 and/or step 1040 may comprise sending a second network node a request that includes the second identifier (i.e., the identifier that the first network node received from the wireless device in response to the page). The second network node may be configured to retrieve and/or generate the location indicator based on the information in the request, including the second identifier. The second network node may respond to the request by communicating the location indicator, e.g., UE AS Context ID, to the requesting network node. Determining the location indicator in step 940 and/or step 1040 may further comprise receiving the location indicator in a response from the second network node. In this manner, the network node may determine the location indicator from another network node, which, in some embodiments, may be accessible across the network or some portion thereof.

In certain embodiments, method 900 and/or method 1000 further includes the step of generating the first identifier prior to receiving the second identifier from the wireless device. The first identifier is generated based on the location indicator. For example, the network node may generate a Resume ID as the first identifier using a scrambling and/or encryption function or a random (or pseudo-random) process using the location indicator to generate the first identifier. The network node may then page the first identifier to the wireless device. In some embodiments, generating the first identifier comprises encrypting the location indicator. For example, the network node may encrypt the location indicator using a public and private key encryption and use the encrypted location indicator as the first identifier or some component thereof. In some embodiments, generating the first identifier includes using a lookup table that comprises a mapping between the location indicator and the first identifier.

In certain embodiments, method 900 and/or method 1000 further includes the step of receiving at least the first identifier from a second network node prior to receiving the second identifier from the wireless device. As an example, the second network node may comprise a database from which the network node receives the first identifier. As another example, the second network node may be a base station (e.g., eNB/gNB) that served the wireless device until the connection was suspended. As another example, the second network node may be another network entity that manages the connections or connection information for the wireless device or the network nodes serving the wireless device. The second network node may have stored information regarding the connection, e.g., context information and/or location indicator for the location storing the context information. In the case the network initiates resuming the connection with the wireless device, the second network node may communicate at least the first identifier to network nodes within the RAN paging area for that wireless device. Alternatively, if the wireless device initiates resuming the connection, the network node may communicate with other network nodes to request the first identifier for that wireless device, e.g., the network node may send requests to network nodes with which it shares a RAN paging area or may request the first identifier through another network entity such as a network database. In response, the second network node may provide the first identifier for that suspended connection. In some embodiments, the network node may receive the location indicator from the second network node in addition to the first identifier.

Figure 11:
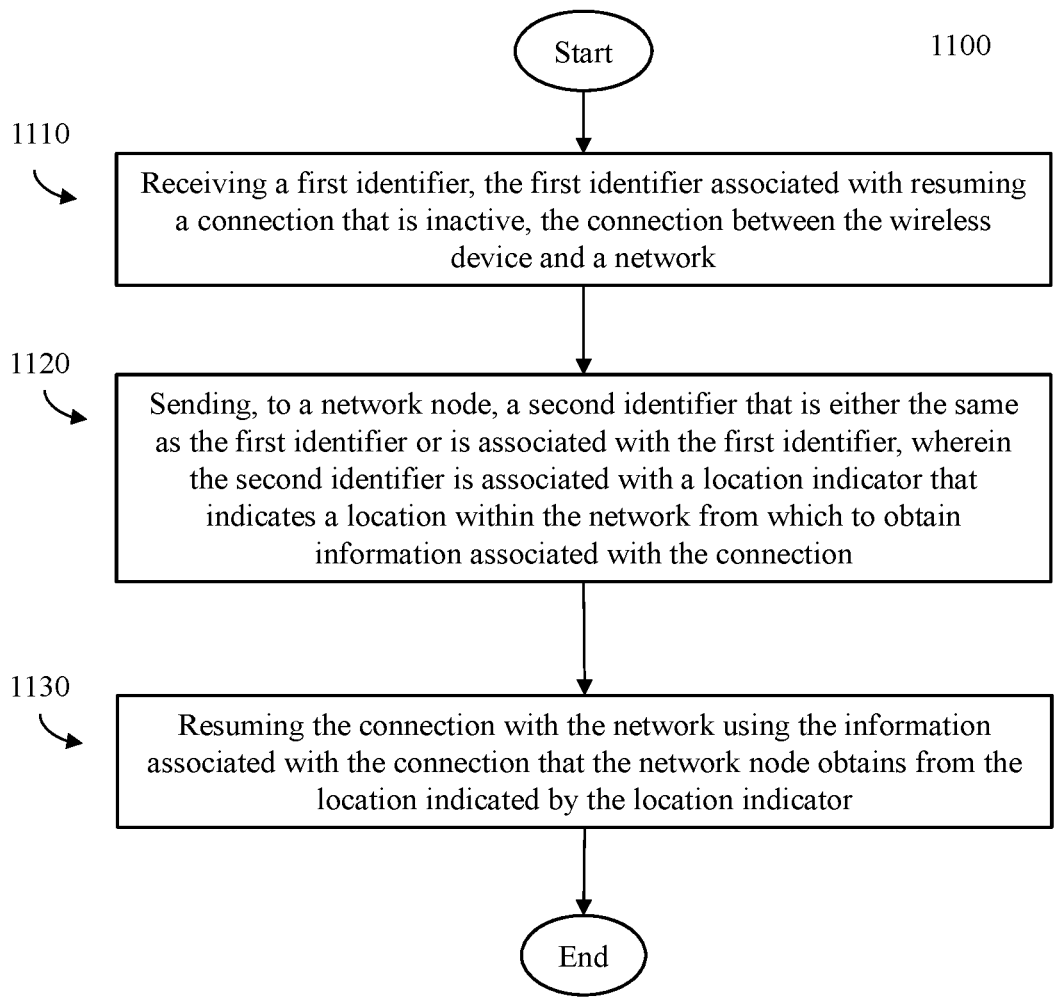
FIG. 11 is a flow diagram of a method in a wireless device, in accordance with certain embodiments.

FIG. 11 is a flow chart diagram illustrating an example method 1100 for use in user equipment 120 for resuming a connection on a network 100, according to certain embodiments of the present disclosure. At step 1100, user equipment 120 may receive a first identifier. The first identifier is associated with resuming a connection that is inactive. The connection is between a wireless device and a network. In some embodiments, method 1100 may begin when user equipment 120 is in an inactive state. For example, user equipment 120 may receive a page from one of network nodes 110 in network 100 containing the first identifier. As a particular example, the page may include a ResumeID for the inactive connection. In some embodiments, the user equipment begins method 1100 in an active state. As another example, user equipment 120 may obtain the first identifier in a suspend request from a network node and subsequently go into a suspended or inactive state.

At step 1120, user equipment 120 may send, to a network node, a second identifier that is either the same as the first identifier or is associated with the first identifier. For example, user equipment 120 may respond to the page with the same ResumeID or may respond with a different identifier, such as the UE AS Context ID or a scrambled version of any of the identifiers. As another example, user equipment may send the second identifier in a request to resume the suspended connection without being paged in the network. The second identifier is associated with a location indicator that indicates a location within the network from which to obtain information associated with the connection. For example, the second identifier may be used to obtain the connection information for the connection that user equipment 120 was a part of with network 100. In particular, the second identifier may help the network node to determine where the UE Context information is located and retrieve it in order to resume the connection with user equipment 120.

At step 1130, user equipment 120 resumes the connection network 100 using the information associated with the connection that the network node obtains from the location indicated by the location indicator. For example, the network node may use the second identifier to retrieve the UE Context information, as described in the various embodiments disclosed herein. Using that UE Context information, the network node may signal the user equipment to resume the connection. In this manner, user equipment 120 may securely resume a connection on network 100.

Method 1100 may include additional steps and/or substeps. In certain embodiments, method 1100 further include receiving a request from the network to suspend the connection in response to inactivity of the wireless device. For example, a network node currently serving the wireless device may determine that the wireless has been inactive or the wireless device may communicate to the network that it does not require network resources in the immediate future. In response, the network may communicate a response to the wireless device to suspend the connection, e.g., the serving network node may transmit the request to suspend the connection between it and the wireless device. This optional step may occur before step 1110 and/or after step 1130. In some embodiments, the request from the network to suspend the connection comprises a third identifier associated with a second location within the network from which to obtain information associated with the connection. For example, after step 1130, the wireless device may have resumed a connection with a different network node. This new network node may subsequently determine the wireless device is inactive and request the suspension of its connection. The request may include a third identifier, such as a new Resume ID, associated with the updated information about the connection. For example, the third identifier may be associated with a new location at which the new wireless device context information may be stored and/or the location indicator for that location. In some embodiments, the request to suspend the connection further includes the second location indicator.

In certain embodiments, method 1110 includes the use of public/private key encryption. For example, method 1110 may further include the step of the wireless device receiving a public encryption key associated with the network node. The public encryption key may correspond to a private encryption key associated with a network entity that may be used to determine the location indicator and/or connection information for the suspended connection. In some embodiments, step 1120 sending the response to the network node comprises encrypting at least a portion of the second identifier by the public encryption key associated with the network node. In this manner, the user equipment may secure the information sent over the network to resume the connection.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203 to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a, number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a network node, comprising:
obtaining a first identifier associated with resuming an inactive connection between a wireless device and a network;
receiving a second identifier from the wireless device, wherein the second identifier is either the same as the first identifier or is associated with the first identifier;
determining a location indicator based on the second identifier, wherein the location indicator indicates a location within the network from which to obtain information associated with the connection;
obtaining the information associated with the connection from the location indicated by the location indicator; and
using the information associated with the connection to facilitate resuming the connection between the wireless device and the network.

2. The method of claim 1, further comprising:
sending a page to the wireless device, wherein the page comprises the first identifier; and
wherein the second identifier is received in response to the page.

3. The method of claim 1, wherein determining the location indicator comprises:
sending a request to a second network node, the request comprising the second identifier; and
receiving the location indicator from the second network node in response to sending the request comprising the second identifier.

4. The method of claim 1, further comprising generating the first identifier prior to receiving the second identifier from the wireless device, wherein the first identifier is generated based on the location indicator.

5. The method of claim 4, wherein the first identifier is generated randomly or pseudo-randomly based on the location indicator.

6. The method of claim 1, further comprising receiving at least the first identifier from a second network node, wherein the second network node suspended the connection with the wireless device.

7. The method of claim 1, further comprising:
detecting inactivity at the wireless device; and
sending a request to the wireless device to suspend the connection.

8. The method of claim 7, wherein the request to the wireless device to suspend the connection comprises a third identifier associated with a second location within the network from which to obtain information associated with the connection.

9. The method of claim 8, wherein the request to the wireless device to suspend the connection further comprises a second location indicator indicating the second location within the network from which to obtain information associated with the suspended connection.

10. The method of claim 7, further comprising:
sending the second location indicator to a second network node in response to detecting inactivity at the wireless device; and
obtaining the third identifier associated with the second location indicator from the second network node;
wherein the request to the wireless device to suspend the connection comprises the third identifier.

11. The method of claim 7, further comprising assigning a third identifier associated with the wireless device and wherein the request to the wireless device to suspend the connection comprises the third identifier.

12. The method of claim 7, further comprising generating a third identifier associated with the wireless device based on the second identifier and wherein the request to the wireless device to suspend the connection comprises the third identifier.

13. The method of claim 1, wherein the location indicator comprises a user equipment AS Context ID.

14. The method of claim 1, wherein neither the first identifier nor the second identifier provides the location indicator in clear text form.

15. The method of claim 1, further comprising:
sending the wireless device a public encryption key associated with the network node; and
wherein at least a portion of the received second identifier is encrypted by the public encryption key associated with the network node.

16. A network node, comprising:
one or more interfaces;
memory; and
processing circuitry configured to execute instructions stored by the memory, whereby the network node is configured to:
obtain a first identifier associated with resuming an inactive connection between a wireless device and a network, the first identifier obtained via the one or more interfaces;
receive, via the one or more interfaces, a second identifier from the wireless device, wherein the second identifier is either the same as the first identifier or is associated with the first identifier;
determine a location indicator based on the second identifier, wherein the location indicator indicates a location within the network from which to obtain information associated with the connection;
obtain the information associated with the connection from the location indicated by the location indicator; and
use the information associated with the connection to facilitate resuming the connection between the wireless device and the network.

17. The network node of claim 16, wherein the network node is further configured to:
send, via the one or more interfaces a page to the wireless device, wherein the page comprises the first identifier; and
wherein the second identifier is received in response to the page.

18. The network node of claim 16, wherein the network node is further configured to:
send a request to a second network node, the request comprising the second identifier; and
receive the location indicator from the second network node in response to sending the request comprising the second identifier.

19. The network node of claim 16, wherein the network node is further configured to generate the first identifier prior to receiving the second identifier from the wireless device, wherein the first identifier is generated based on the location indicator.

20. The network node of claim 19, wherein the first identifier is generated randomly or pseudo-randomly based on the location indicator.

21. The network node of claim 16, wherein the network node is further configured to receive at least the first identifier from a second network node, wherein the second network node suspended the connection with the wireless device.

22. The network node of claim 16, wherein the network node is further configured to:
detect inactivity at the wireless device; and
send a request to the wireless device to suspend the connection.

23. The network node of claim 22, wherein the request to the wireless device to suspend the connection comprises a third identifier associated with a second location within the network from which to obtain information associated with the connection.

24. The network node of claim 23, wherein the request to the wireless device to suspend the connection further comprises a second location indicator indicating the second location within the network from which to obtain information associated with the suspended connection.

25. The network node of claim 22, wherein the network node is further configured to:
send the second location indicator to a second network node in response to detecting inactivity at the wireless device; and
obtain the third identifier associated with the second location indicator from the second network node;
wherein the request to the wireless device to suspend the connection comprises the third identifier.

26. The network node of claim 22, wherein the network node is further configured to assign a third identifier associated with the wireless device and wherein the request to the wireless device to suspend the connection comprises the third identifier.

27. The network node of claim 22, wherein the network node is further configured to generate a third identifier associated with the wireless device based on the second identifier and wherein the request to the wireless device to suspend the connection comprises the third identifier.

28. The network node of claim 16, wherein the location indicator comprises a user equipment AS Context ID.

29. The network node of claim 16, wherein neither the first identifier nor the second identifier provides the location indicator in clear text form.

30. The network node of claim 16, wherein the network node is further configured to:
send the wireless device a public encryption key associated with the network node;
wherein at least a portion of the received second identifier is encrypted by the public encryption key associated with the network node.

31. A method in a wireless device, comprising,
receiving a first identifier, the first identifier associated with resuming a connection that is inactive, the connection between the wireless device and a network;
sending, to a network node, a second identifier that is either the same as the first identifier or is associated with the first identifier, wherein the second identifier is associated with a location indicator that indicates a location within the network from which to obtain information associated with the connection; and
resuming the connection with the network using the information associated with the connection that the network node obtains from the location indicated by the location indicator.

32. The method of claim 31, wherein the first identifier is generated randomly or pseudo-randomly based on the location indicator.

33. The method of claim 31, further comprising receiving a request to suspend the connection in response to inactivity of the wireless device.

34. The method of claim 33, wherein the request to suspend the connection comprises a third identifier associated with a second location within the network from which to obtain information associated with the connection.

35. The method of claim 34, wherein the request to suspend the connection further comprises a second location indicator indicating the second location within the network from which to obtain information associated with the connection.

36. The method of claim 31, wherein the location indicator comprises a user equipment AS Context ID.

37. The method of claim 31, wherein the location within the network from which to obtain information associated with the suspended connection corresponds to a location of a second network node to which the wireless device has a suspended connection.

38. The method of claim 31, further comprising obtaining the location indicator using the first identifier and wherein the second identifier sent to the network node comprises the location indicator.

39. The method of claim 31, further comprising:
receiving a public encryption key associated with the network node; and
wherein sending the response to the network node comprises encrypting at least a portion of the second identifier by the public encryption key associated with the network node.

40. The method of claim 31, wherein neither the first identifier nor the second identifier provides the location indicator in clear text form.

41. The method of claim 31, wherein:
receiving the first identifier comprises receiving a page from the network node, the page comprising the first identifier; and
the second identifier is sent to the network node in response to the page.

42. The method of claim 33, wherein the request to the wireless device to suspend the connection comprises a third identifier based on the location indicator.

43. The method of claim 42, wherein the request to the wireless device to suspend the connection further comprises the location indicator.

44. A wireless device, comprising:
one or more interfaces;
memory; and
processing circuitry configured to execute instructions stored in the memory, whereby the wireless device is configured to:
receive, via the one or more interfaces, a first identifier, the first identifier associated with resuming a connection that is inactive, the connection between the wireless device and a network;
send, via the one or more interfaces, to a network node, a second identifier that is either the same as the first identifier or is associated with the first identifier, wherein the second identifier is associated with a location indicator that indicates a location within the network from which to obtain information associated with the connection; and
resume the connection with the network using the information associated with the connection that the network node obtains from the location indicated by the location indicator.

45. The wireless device of claim 44, wherein the first identifier is generated randomly or pseudo-randomly based on the location indicator.

46. The wireless device of claim 44, wherein the wireless device is further configured to receive a request to suspend the connection in response to inactivity of the wireless device.

47. The wireless device of claim 46, wherein the request to suspend the connection comprises a third identifier associated with a second location within the network from which to obtain information associated with the connection.

48. The wireless device of claim 47, wherein the request to suspend the connection further comprises a second location indicator indicating the second location within the network from which to obtain information associated with the connection.

49. The wireless device of claim 44, wherein the location indicator comprises a user equipment AS Context ID.

50. The wireless device of claim 44, wherein the location within the network from which to obtain information associated with the suspended connection corresponds to a location of a second network node to which the wireless device has a suspended connection.

51. The wireless device of claim 44, wherein the wireless device is further configured to obtain the location indicator using the first identifier and wherein the second identifier sent to the network node comprises the location indicator.

52. The wireless device of claim 44, wherein the wireless device is further configured to:
receive a public encryption key associated with the network node;
wherein sending the response to the network node comprises encrypting at least a portion of the second identifier by the public encryption key associated with the network node.

53. The wireless device of claim 44, wherein neither the first identifier nor the second identifier provides the location indicator in clear text form.

54. The wireless device of claim 44, wherein:
the wireless device configured to receive the first identifier comprises the wireless device configured to receive a page from the network node, the page comprising the first identifier; and
the second identifier is sent to the network node in response to the page.

55. The wireless device of claim 46, wherein the request to the wireless device to suspend the connection comprises a third identifier based on the location indicator.

56. The wireless device of claim 55, wherein the request to the wireless device to suspend the connection further comprises the location indicator.

* * * * *